US012619284B2

(12) United States Patent
Choi et al.

(10) Patent No.: US 12,619,284 B2
(45) Date of Patent: May 5, 2026

(54) DISPLAY SUPPORT STRUCTURE AND DISPLAY DEVICE HAVING THE SAME

(71) Applicant: Samsung Display Co., Ltd., Yongin-si (KR)

(72) Inventors: Dongwon Choi, Seoul (KR); Jonghwa Lee, Hwaseong-si (KR); Beomjin Kim, Asan-si (KR); Jiyeon Kim, Hwaseong-si (KR); Tae-Ho Kim, Hwaseong-si (KR); Jin Hwan Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 628 days.

(21) Appl. No.: 18/073,145

(22) Filed: Dec. 1, 2022

(65) Prior Publication Data

US 2023/0288963 A1     Sep. 14, 2023

(30) Foreign Application Priority Data

Mar. 14, 2022     (KR) ........................ 10-2022-0031608

(51) Int. Cl.
G06F 1/16          (2006.01)

(52) U.S. Cl.
CPC .......... G06F 1/1656 (2013.01); G06F 1/1652 (2013.01)

(58) Field of Classification Search
CPC .... G06F 1/1656; G06F 1/1652; G06F 1/1601; G06F 1/1637; H10K 50/84; H10K 77/111; H10K 2102/311
See application file for complete search history.

(56) References Cited

U.S. PATENT DOCUMENTS 8,009,421 B2 *   8/2011   Misawa ............ G02F 1/133308
                                                         345/157
8,009,422 B2 *   8/2011   Misawa ............ G02F 1/133308
                                                         345/157
(Continued)

FOREIGN PATENT DOCUMENTS

EP            3842895 A1     6/2021
KR       1020170095636 A     8/2017
(Continued)

OTHER PUBLICATIONS

Li et al., "Analytical and numerical studies on impact force profile of RCE beam under drop weight impact", Center for Infrastructural Monitoring and protection, School of Civil and Mecahanical Engineering, Curtin University, Australia , vol. 147, Jan. 2021, 103743.

*Primary Examiner* — Imani N Hayman
*Assistant Examiner* — Theron S Milliser
(74) *Attorney, Agent, or Firm* — CANTOR COLBURN LLP

(57) ABSTRACT

A display device includes a display panel rollable about a rolling axis extending in a first direction, and a support member facing the display panel and rollable together with the display panel. The support member includes a support layer defining an upper surface of the support member and a lower surface of the support member which is opposite to the upper surface and further from the display panel than the upper surface, and a plurality of support bars within the support layer and each extending in the first direction, the plurality of support bars being arranged in a second direction crossing the first direction. Within the support layer, each of the plurality of support bars is convexly curved toward the upper surface of the support member, along the first direction.

21 Claims, 14 Drawing Sheets

(56)           References Cited

U.S. PATENT DOCUMENTS

| | | | | |
|---|---|---|---|---|
| 8,576,555 B2* | 11/2013 | Misawa | ............ | G02F 1/133308 |
| | | | | 345/157 |
| 9,019,696 B2* | 4/2015 | Hamers | ................ | G06F 1/1652 |
| | | | | 361/679.55 |
| 9,940,892 B2 | 4/2018 | Pang | | |
| 10,061,358 B2 | 8/2018 | Lee et al. | | |
| 10,362,690 B2 | 7/2019 | Han | | |
| 10,424,229 B2 | 9/2019 | Kim et al. | | |
| 10,687,428 B2 | 6/2020 | Kim et al. | | |
| 10,798,831 B2 | 10/2020 | Shin et al. | | |
| 11,557,231 B2* | 1/2023 | Wu | ........................ | G06F 1/1601 |
| 11,887,511 B2* | 1/2024 | Wu | ........................ | G06F 1/1652 |
| 11,977,414 B2* | 5/2024 | Park | .................... | H04M 1/0268 |
| 11,997,804 B2* | 5/2024 | Kim | ........................ | G06F 1/1624 |
| 12,103,812 B2* | 10/2024 | Wang | ............... | B65H 75/4465 |
| 12,144,216 B2* | 11/2024 | Choi | .................... | H10K 77/111 |
| 12,174,667 B2* | 12/2024 | Choi | ........................ | B32B 7/022 |
| 12,266,277 B2* | 4/2025 | Wu | ........................... | G06F 1/20 |
| 12,346,166 B2* | 7/2025 | Ahn | ........................ | G06F 1/1624 |
| 12,376,240 B2* | 7/2025 | Choi | .................... | G06F 1/1652 |
| 2006/0038745 A1* | 2/2006 | Naksen | ................ | G06F 1/1624 |
| | | | | 257/40 |
| 2008/0212271 A1* | 9/2008 | Misawa | .................... | G09F 9/35 |
| | | | | 361/679.01 |
| 2010/0182288 A1* | 7/2010 | Misawa | .................... | G09F 9/35 |
| | | | | 345/204 |
| 2011/0140995 A1* | 6/2011 | Hamers | .................. | G09F 9/301 |
| | | | | 345/30 |
| 2011/0273826 A1* | 11/2011 | Misawa | ................. | G09F 11/02 |
| | | | | 361/679.01 |
| 2012/0014082 A1* | 1/2012 | Naksen | ................. | G06F 1/1637 |
| | | | | 361/807 |
| 2017/0364119 A1* | 12/2017 | Lee | ........................ | G06F 1/1652 |
| 2019/0172377 A1* | 6/2019 | Kim | ........................ | G06F 1/1652 |
| 2020/0084897 A1* | 3/2020 | Shin | ........................ | H05K 1/147 |
| 2021/0090476 A1 | 3/2021 | Kang et al. | | |
| 2022/0036772 A1* | 2/2022 | Wu | ........................ | G06F 1/1601 |
| 2022/0238626 A1* | 7/2022 | Choi | .................... | G06F 1/1624 |
| 2022/0264754 A1* | 8/2022 | Kim | ........................ | G06F 1/1637 |
| 2022/0269312 A1 | 8/2022 | Choi et al. | | |
| 2022/0357775 A1 | 11/2022 | Choi et al. | | |
| 2023/0147918 A1* | 5/2023 | Wu | ........................ | G06F 1/1652 |
| | | | | 361/679.01 |
| 2023/0176620 A1* | 6/2023 | Choi | ........................ | G09F 9/301 |
| 2023/0195169 A1* | 6/2023 | Park | .................... | H04M 1/0268 |
| 2023/0269890 A1* | 8/2023 | Choi | .................... | H05K 5/0217 |
| | | | | 361/807 |
| 2023/0288963 A1* | 9/2023 | Choi | ........................ | G06F 1/1652 |
| 2023/0315155 A1* | 10/2023 | Ahn | ........................ | G06F 1/1637 |
| 2024/0109750 A1* | 4/2024 | Wang | .................... | B65H 75/38 |
| 2024/0127720 A1* | 4/2024 | Wu | ........................ | G06F 1/1652 |
| 2024/0130060 A1* | 4/2024 | Park | .................... | G06F 1/1652 |
| 2025/0201152 A1* | 6/2025 | Wu | ........................ | G09F 9/301 |

FOREIGN PATENT DOCUMENTS

| | | | |
|---|---|---|---|
| KR | 1020170141438 A | 12/2017 | |
| KR | 1020190054427 A | 5/2019 | |
| KR | 1020200030265 A | 3/2020 | |
| KR | 102180801 B1 | 11/2020 | |
| KR | 1020210014801 A | 2/2021 | |
| KR | 1020210033696 A | 3/2021 | |
| KR | 1020210041665 A | 4/2021 | |

* cited by examiner

FIG. 2B

DISPLAY SUPPORT STRUCTURE AND DISPLAY DEVICE HAVING THE SAME

This application claims priority to Korean Patent Application No. 10-2022-0031608 filed on Mar. 14, 2022, and all the benefits accruing therefrom under 35 U.S.C. § 119, the disclosure of which is incorporated by reference herein in its entirety.

BACKGROUND

(1) Field

Embodiments of the present disclosure described herein relate to a display device, and more particularly, relate to a rollable display device.

(2) Description of the Related Art

Electronic devices, such as a smart phone, a digital camera, a notebook computer, a car navigation device, a smart television, and the like, which provide an image to outside the electronic device, such as to a user, include a display device for displaying an image. The display device provides the image to outside the electronic device through a display screen.

With the development of display device technology, various forms of display devices are being developed. For example, various flexible display devices that can be curved, folded, or rolled are being developed.

SUMMARY

Among flexible display devices, a rollable display device may be easy to carry and may improve a convenience of using thereof. However, the rollable display device having a relatively small thickness so as to be rolled may be vulnerable to external impact.

Embodiments of the present disclosure provide a display device including a display module having improved surface quality and impact resistance.

According to an embodiment, a display device includes a display panel rolled about a rolling axis extending in a first direction, and a support member that supports the display panel. The support member includes a plurality of support bars, each of which extends in the first direction, the support bars being arranged in a second direction crossing the first direction and a support layer that covers the support bars and that includes an upper surface facing the display panel and a lower surface opposite to the upper surface. Each of the support bars has long curved sides that extend in the first direction on a section viewed in the second direction and are convex toward the display panel.

Each of the support bars may extend in the first direction and may have a first curved surface that faces the display panel and that is formed to be convex and a second curved surface that is opposite to the first curved surface and that is formed to be concave.

The support layer may cover the first curved surface and the second curved surface.

On the section, a gap between the first curved surface and the upper surface may be gradually decreased from ends of the support bars toward the centers of the support bars.

On the section, a gap between the second curved surface and the lower surface may be gradually increased from ends of the support bars toward the centers of the support bars.

The upper surface and the lower surface of the support layer may be parallel to each other.

Each of the support bars may have a constant thickness in the first direction.

Each of the support bars may have an increasing thickness from an end of the support bar toward the center of the support bar in the first direction.

Each of the support bars may have one of a rectangular shape, a rhombic shape, an inverted trapezoidal shape, and an inverted triangular shape on a section viewed in the first direction.

Each of the support bars may have a higher modulus than the support layer.

Each of the support bars may contain metal or carbon fibers, and the support layer may contain an elastomer.

The support member may further include coating films that surround the support bars, respectively, and each of the coating films may have a modulus higher than a modulus of the support layer and lower than a modulus of each of the support bars.

Widths of the support bars in the second direction may be equal to each other.

The support bars may include at least one central support bar having the smallest width in the second direction, left support bars arranged on a left side of the central support bar in the second direction, and right support bars arranged on a right side of the central support bar in the second direction. Widths of the left support bars and the right support bars may be gradually increased farther away from the central support bar.

According to an embodiment, a display device includes a display panel rolled about a rolling axis extending in a first direction and a support member disposed under the display panel. The support member includes a support layer including an upper surface facing the display panel and a lower surface opposite to the upper surface and a plurality of support bars disposed in the support layer, and each of the support bars includes a first surface adjacent to the upper surface and a second surface opposite to the first surface. On a section viewed in a second direction crossing the first direction, a gap between the second surface and the lower surface varies depending on areas of the support member.

On the section viewed in the second direction, a lower thickness of the support layer disposed under the second surface may be gradually increased from an end of the support bar toward the center of the support bar.

On the section viewed in the second direction, an upper thickness of the support layer disposed above the first surface may be gradually decreased from an end of the support bar toward the center of the support bar.

Each of the support bars may contain metal or carbon fibers, and the support layer may contain a polymer.

Each of the first surface and the second surface may have a curved surface with a center of curvature defined under the support bar, and the first surface may have the same curvature as the second surface.

Each of the first surface and the second surface may have a curved surface with a center of curvature defined under the support bar, and the first surface may have a curvature greater than a curvature of the second surface.

BRIEF DESCRIPTION OF THE FIGURES

The above and other objects and features of the present disclosure will become apparent by describing in detail embodiments thereof with reference to the accompanying drawings.

FIGS. 2A and 2B are sectional views of a display device according to an embodiment of the present disclosure.

DETAILED DESCRIPTION

Figure 1A:
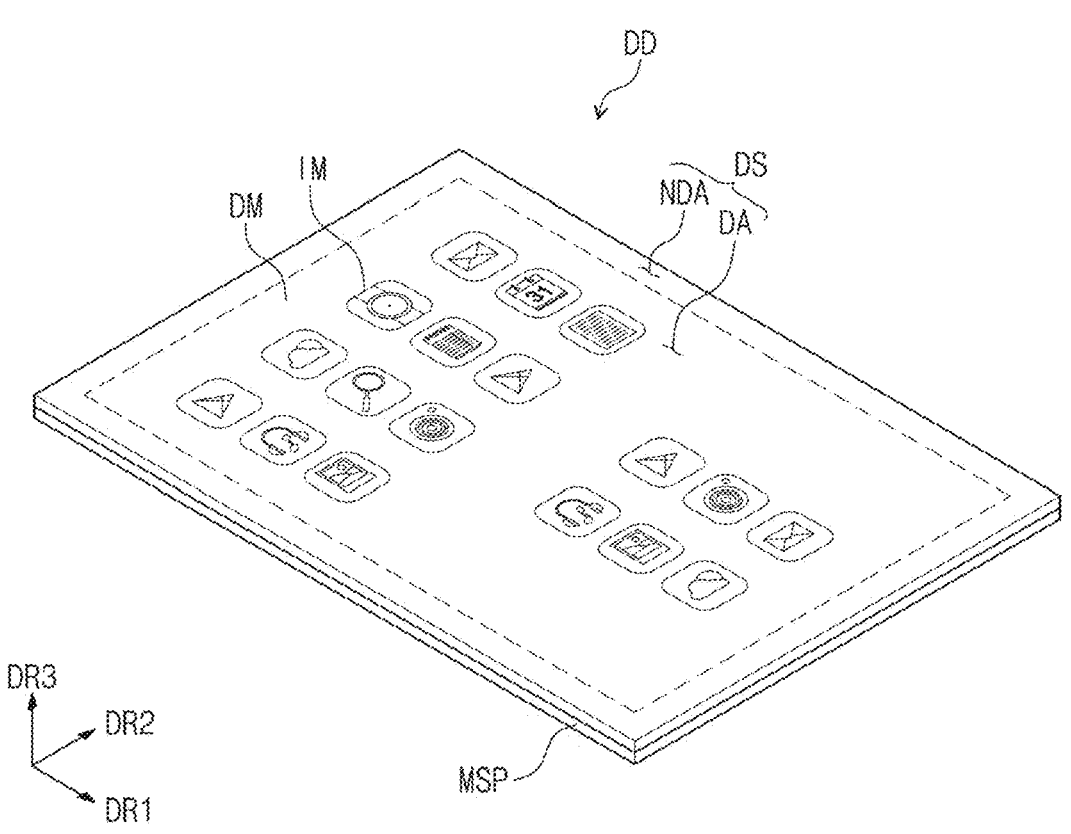
FIG. 1A is a perspective view of a display device according to an embodiment of the present disclosure.

Various changes can be made to the present disclosure, and various embodiments of the present disclosure may be implemented. Thus, embodiments are illustrated in the drawings and described as examples herein. However, it should be understood that the present disclosure is not to be construed as being limited thereto and covers all modifications, equivalents, and alternatives falling within the spirit and scope of the present disclosure.

In this specification, when it is mentioned that a component (or, an area, a layer, a part, etc.) is referred to as being related to another element such as being "on", "connected to" or "coupled to" another component, this means that the component may be directly on, connected to, or coupled to the other component or a third component may be present therebetween. In contrast, when it is mentioned that a component (or, an area, a layer, a part, etc.) is referred to as being related to another element such as being "directly on", "directly connected to" or "directly coupled to" another component, this means that no third component is therebetween.

Identical reference numerals refer to identical components. As used herein, a reference number may indicate a singular element or a plurality of the element. For example, a reference number labeling a singular form of an element within the drawing figures may be used to reference a plurality of the singular element within the text of specification.

Additionally, in the drawings, the thicknesses, proportions, and dimensions of components are exaggerated for effective description. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device DD according to an embodiment of the present disclosure will be described with reference to the accompanying drawings.

Figure 1B:
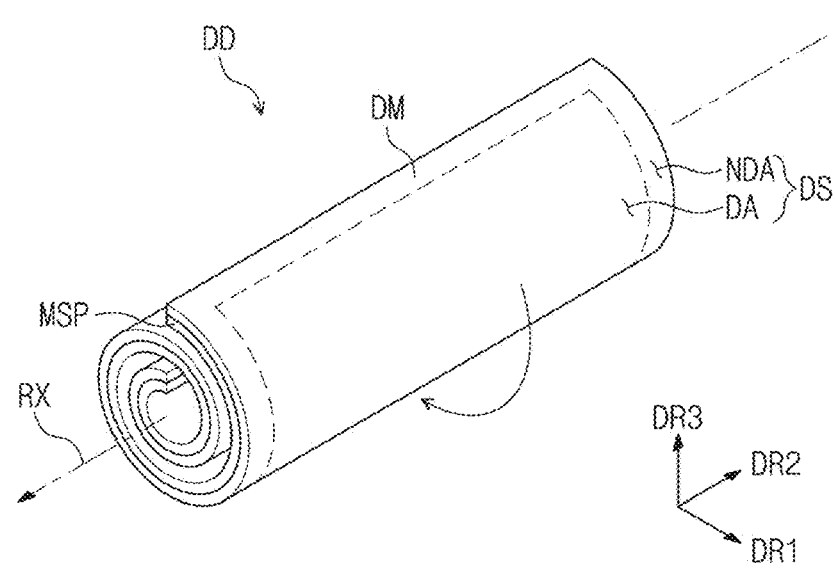
FIG. 1B is a perspective view illustrating a rolled state of the display device illustrated in FIG. 1A.

FIG. 1A is a perspective view of the display device DD according to an embodiment of the present disclosure. FIG. 1B is a perspective view illustrating the display device DD illustrated in FIG. 1A which is rolled (e.g., in a rolled state).

The display device DD may be a device that is activated in response to an electrical signal and that displays an image IM. For example, the display device DD may be a large device such as a television, outdoor signage, or the like, or may be a small and medium-sized device such as a monitor, a mobile phone, a tablet computer, a car navigation device, a game machine, or the like. However, embodiments of the display device DD are not limited thereto as long as they do not depart from the spirit and scope of the present disclosure.

The display device DD according to an embodiment may be a flexible display device. The term "flexible" used herein may refer to a property of being foldable, curvable, rollable, etc. such as to be curved, and may include everything from a structure that can be fully folded to a structure that can be curved to a level of several nanometers. For example, the flexible display device DD may include a rollable display device that is rolled about a virtual axis. FIG. 1A illustrates the display device DD which is unrolled or flat (e.g., in an unrolled state), and FIG. 1B illustrates the display device DD in a rolled state.

Referring to FIG. 1A, the display device DD in the unrolled state may have a rectangular shape with long sides extending in a first direction DR1 and short sides extending in a second direction DR2 which crosses the first direction DR1. The display device DD which is unrolled or flat may be disposed in a single plane defined by the first direction DR1 and the second direction DR2 crossing each other. However, without being limited thereto, the display device DD may have various planar shapes such as a circular shape, a polygonal shape, and the like.

The display device DD may include a display module DM and a support member MSP as a support member layer. The display module DM may generate an image IM in response to an electrical signal and may provide the image IM to outside the display device DD, such as to a user of an electronic device, through a display surface DS. The display module DM in the unrolled state may display the image IM in a third direction DR3 on or at the display surface DS extended parallel to a plane defined by the first direction DR1 and the second direction DR2. The display surface DS on which the image IM is displayed may correspond to the front surface of the display device DD.

The image IM provided by the display module DM may include a still image as well as a dynamic image. FIG. 1A illustrates a plurality of icons as one example of the image IM.

The front surface (or the top surface) and the rear surface (or the bottom surface) of each of members included in the display device DD may be opposite to each other in the third direction DR3, and the normal directions of the front surface and the rear surface may be substantially parallel to the third direction DR3. The separation distance between the front surface and the rear surface defined in the third direction DR3 may correspond to the thickness of the member. The display device DD and various components or layers thereof may have a thickness along the third direction DR3 (e.g., a thickness direction). The expression "on a plane" or "in a plan view" used herein may mean that it is viewed in (or along) the third direction DR3. The expression "on a section" or "in cross-section" used herein may mean that it is viewed in the first direction DR1 and/or the second direction DR2. However, the directions indicated by the first, second, and third directions DR1, DR2, and DR3 may be relative concepts and may be changed to different directions.

The display surface DS of the display module DM may include a display area DA and a peripheral area NDA. The display area DA may be an area (e.g. a planar area) on which the image IM is displayed, and the peripheral area NDA may be an area on which the image IM is not displayed such as to define a non-display area. The peripheral area NDA may be provided as an area that has a lower light transmittance than the display area DA and has a predetermined color.

The peripheral area NDA may be adjacent to the display area DA. For example, the peripheral area NDA may surround the display area DA in a plan view, and may define the border of the display module DM. However, without being limited thereto, the peripheral area NDA may be disposed adjacent to only one side of the display area DA, or may be omitted. Alternatively, the peripheral area NDA may be disposed on a side surface of the display device DD rather than the front surface thereof.

The support member MSP may be disposed under the display module DM, such as to face the display module DM along the thickness direction, and may support the display module DM. The support member MSP may be attached to the display module DM at the rear surface of the display module DM. For example, the support member MSP may be attached to the rear surface of the display module DM through a separate adhesive layer.

The support member MSP may provide a flat surface along which the display module DM extends, thereby preventing degradation in the surface quality of the display module DM. The support member MSP may have impact resistance and may prevent damage to the display module DM due to external impact. The support member MSP may be curved with a curvature and may support the display module DM in a rolled state to prevent deformation of the display module DM. A configuration of the support member MSP will be described below in detail.

Referring to FIG. 1B, the display device DD may be rolled about a virtual rolling axis RX (hereinafter, referred to as the rolling axis RX) that extends in one direction. For example, the display device DD may be rolled about the rolling axis RX extending in the second direction DR2. Although FIG. 1B illustrates the rolling axis RX extending in the second direction DR2 parallel to the short sides of the display device DD, the present disclosure is not limited thereto, and the display device DD may be rolled about a rolling axis parallel to the long sides of the display device DD.

The display device DD may be rolled such that the display surface DS of the display module DM faces toward the outside (e.g., outside of the display device DD). The support member MSP may be disposed under the display module DM to support the display module DM and may be rollable together with the display module DM. Within the display device DD, various component or layers thereof may be deformable (e.g., foldable, curvable, rollable, etc.) together with each other. However, without being limited thereto, the display device DD may be rolled such that the rear surface of the support member MSP is exposed to the outside. The display device DD in either rolled state (e.g., out-rolled or in-rolled) may be easy to carry as the display device DD is reduced in overall planar area or planar size. Accordingly, the display device DD having the display surface DS as a relatively large planar area, may be rolled to have a reduced planar area and accommodated in an accommodating member.

Figure 2A:
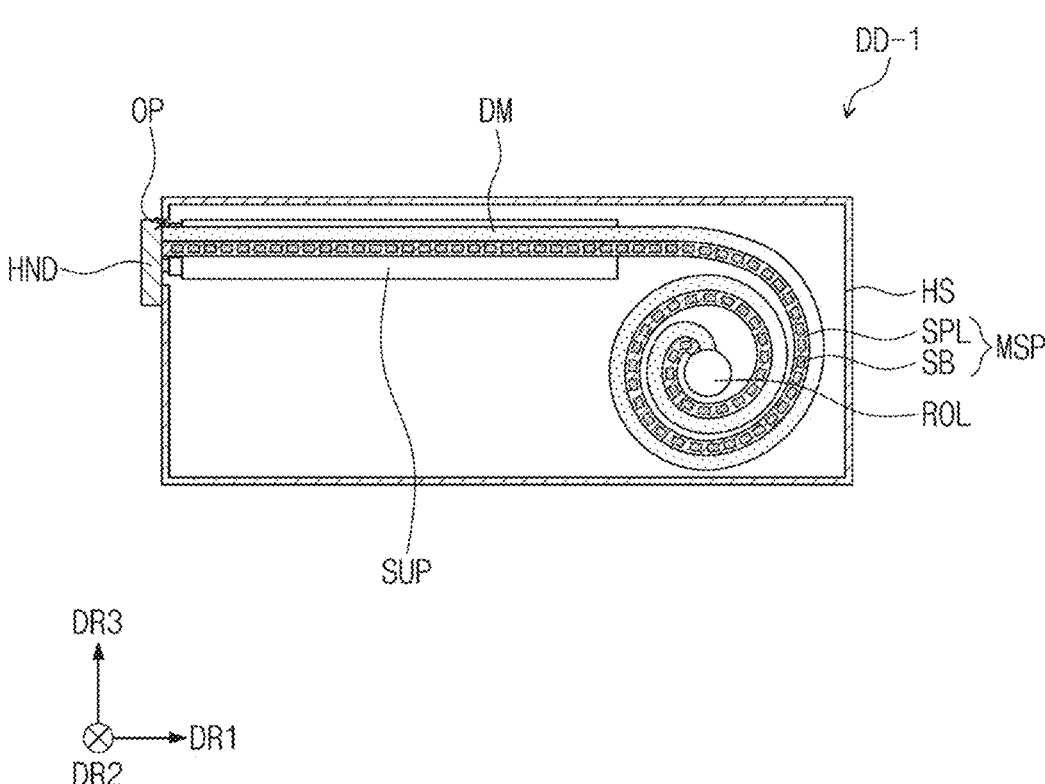
Figure 2B:
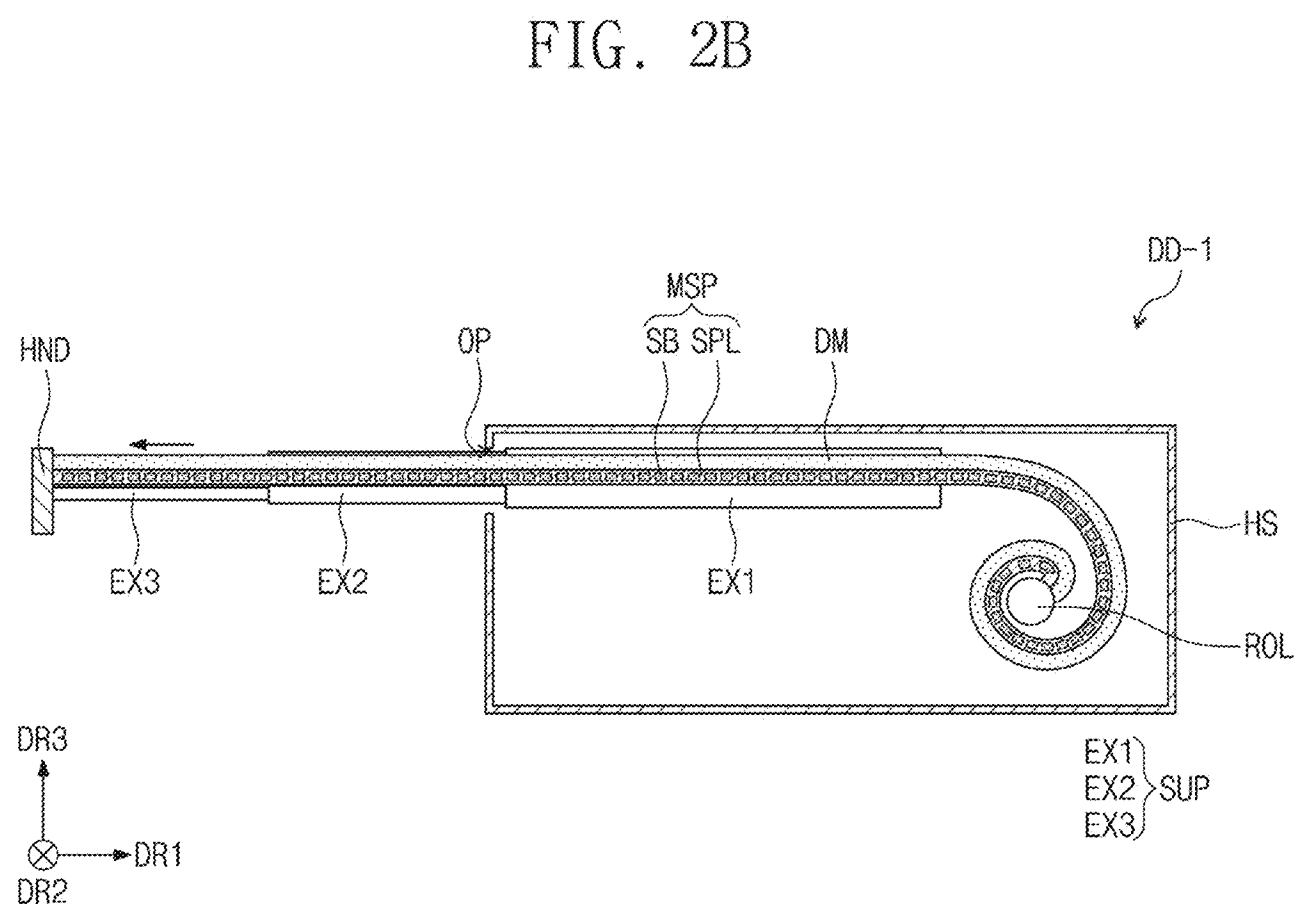

FIGS. 2A and 2B are sectional views of a display device DD-1 according to an embodiment. FIG. 2A illustrates the display device DD-1 in a state in which a display module DM is rolled and accommodated in a housing HS, and FIG. 2B illustrates the display device DD-1 in a state in which a portion of the display module DM is unrolled and disposed outside the housing HS to define an exposed portion of the display module DM outside of the housing HS.

Referring to FIGS. 2A and 2B, the display device DD-1 according to an embodiment may include the housing HS, the display module DM, a support member MSP, a roller ROL, a support part SUP, and a handle HND. The display module DM, the support member MSP, the roller ROL, and the support part SUP may be accommodated in the housing HS, such as at an inner area of the housing HS. The above description may be identically applied to the display module DM and the support member MSP.

The housing HS may include an top surface of an upper portion which is parallel to the first direction DR1 and the second direction DR2 (e.g., parallel to a plane defined by the first direction DR1 and the second direction DR2), a bottom surface of a lower portion which is opposite to the top surface along the thickness direction (e.g., third direction DR3), and side surfaces of a side portion which connect the top surface and the bottom surface to each other. The upper portion, the lower portion and the side portion of the housing HS together form an accommodating space inside the housing HS. In FIG. 2A, the housing HS is illustrated as having a rectangular cross-sectional shape. However, the shape of the housing HS is not limited to any one as long as the housing HS is capable of accommodating the display module DM.

An opening OP may be defined in or by at least one side surface as a sidewall portion which is among the side surfaces of the housing HS. In FIG. 2A, the opening OP defined in one side surface of the housing HS extended parallel to the second direction DR2 and the third direction DR3 is illustrated. The opening OP may be formed adjacent to the upper portion of the housing HS. However, the position of the opening OP is not limited thereto. The accommodating space may be exposed to outside the housing HS at the opening OP.

The roller ROL may be disposed in the housing HS so as to be adjacent to an opposite side surface of the housing HS that is spaced apart from the side surface of the housing HS at which the opening OP is defined, in the first direction DR1. The roller ROL may have a cylindrical shape extending in the second direction DR2, where a major dimension of the roller ROL is defined along the second direction DR2. The roller ROL may have a circular shape when viewed in the second direction DR2. The extension direction of the roller ROL may correspond to the extension direction of a rolling axis. The roller ROL may be rotatable in both the clockwise and counterclockwise directions. The display device DD-1 according to an embodiment may further include an actuator (not show) for controlling rotation of the roller ROL.

The handle HND may be disposed on the outside of the housing HS that is adjacent to the opening OP, or may be accessible from outside of the housing HS as being adjacent to the opening OP. In an embodiment, the handle HND may cover the opening OP, that is, may have a planar area equal to or greater than a planar area of the opening OP which is defined along the second direction DR2 and the third direction DR3. The handle HND may be movable substantially parallel to the first direction DR1. As illustrated in FIG. 2B, the opening OP may be exposed to the outside when the handle HND moves away from the housing HS in the first direction DR1. The handle HND may be operated from outside the display device DD-1, such as by a user or another component of an electronic device.

The display module DM and the support member MSP may be rolled around the roller ROL. One end (e.g., a first end or a fixed end) of the display module DM and one (e.g., a first end or a fixed end) end of the support member MSP may be connected to the roller ROL. On the section illustrated in FIG. 2A, the display module DM and the support member MSP may be rolled onto the roller, while surrounding the roller ROL, as the roller ROL rotates in the clockwise direction. That is, the display module DM, the support member MSP and the roller ROL may be rollable together with each other. A rolling and unrolling direction of the display device DD-1 may be defined along the first direction DR1.

An opposite end (e.g., a second end or distal end) of the display module DM and an opposite end (e.g., a second end) of the support member MSP may be adjacent to the opening OP (e.g., closer to the opening OP than the first end) and may be connected to the handle HND. On the section illustrated in FIG. 2B, when the handle HND moves away from the housing HS, the roller ROL may rotate in the counterclockwise direction, and portions of the display module DM and the support member MSP may be extended outside the housing HS through the opening OP to define an exposed portion of each of the display module DM and the support member MSP.

The support part SUP may be disposed in the housing HS so as to be adjacent to the opening OP, e.g., closer to the opening OP than to the roller ROL. The support part SUP may extend in a direction parallel to the first direction DR1, such as having a major dimension defined along the first direction DR1. The support part SUP may be provided in plural including a plurality of support parts SUP within the housing HS. The support parts SUP may be respectively disposed on sides of the display module DM and the support member MSP that extend in the first direction DR1. Referring to FIGS. 2A and 2B, the support parts SUP may extend along the third direction DR3 to define portions both above and below the display module DM and the support member MSP.

The support part SUP may support the display module DM and the support member MSP that are disposed in the housing HS. In an embodiment, a guide groove may be defined on or by the support part SUP, and the support member MSP may be disposed in the guide groove and may be supported by the support part SUP. However, embodiments are not limited thereto.

One end of the support part SUP may be connected to the handle HND. The support part SUP may be extendable outside and retractable inside the housing HS through the opening OP, as the handle HND moves along the first direction DR1. The support part SUP which is extended outside the housing HS may support the display module DM and the support member MSP which are also outside the housing HS. That is, the support part SUP may be movable together with the handle HND, as well as together with the display module DM and the support member MSP. The support part SUP which is extended outside of the housing HS, disposes portions of the display module DM and the support member MSP which are also outside the housing HS, supported by the support part SUP at a location outside of the housing HS.

Referring to FIG. 2B, for extension to the outside of the housing HS, the support part SUP may include a first extension EX1 (e.g., a first extension portion), a second extension EX2 (e.g., a second extension portion), and a third extension EX3 (e.g., a third extension portion). The second extension EX2 may be disposed between the first extension EX1 and the third extension EX3 in the first direction DR1.

For a structure capable of being extended in one direction, the second extension EX2 may be insertable into and drawable out of the first extension EX1, and the third extension EX3 may be insertable into and drawable out of the second extension EX2. The first extension EX1 may be disposed in the housing HS. In an embodiment the first extension EX1 may be fixed within an inner area of the housing HS, and may be open to outside the support part SUP at the opening OP. The second and third extensions EX2 and EX3 may be extendable outside of the first extension EX1 and the housing HS, through an open end of the support part SUP and the opening OP of the housing HS. The third extension EX3 may be connected to the handle HND. A total length of the support part SUP along the first direction DR1 may be variable, according to an extension length defined by a total length along the first direction DR1 of the first extension EX1, the second extension EX2 and the third extension EX3.

Guide grooves may be defined on or by the first, second, and third extensions EX1, EX2, and EX3, respectively. The guide grooves defined on the first, second, and third extensions EX1, EX2, and EX3 may be as continuous spaces overlapping each other in the first direction DR1. That is, the guide grooves defined on the first, second, and third extensions EX1, EX2, and EX3 may be aligned with or coplanar with each other along the first direction DR1 and the third direction DR3. End surfaces at opposing sides of the support member MSP along the second direction DR2, may be disposed in the guide grooves defined in the first, second, and third extensions EX1, EX2, and EX3 and may be supported by the first, second, and third extensions EX1, EX2, and EX3.

When the handle HND moves toward the housing HS, the extended support part SUP may be retracted in the first direction DR1 as illustrated in FIG. 2A. Depending on the movement of the handle HND, the support part SUP may be maximally disposed in the housing HS, and the display module DM and the support member MSP may be maximally retracted into the housing HS. That is, the first, second, and third extensions EX1, EX2, and EX3 may be nested to shorten or minimize the total length of the support part SUP, for the display device DD-1 which is closed having the display module DM and support member MSP maximally retracted within the housing HS. In either a process in which the display module DM is extending from or retracting into the housing HS, a portion of the display module DM and a portion of the support member MSP that face the support part SUP and are supported by the support part SUP, may have be flat to be maintained in a flat state.

The support member MSP may include a support layer SPL and a plurality of support bars SB (hereinafter, referred to as the support bars SB). The support bars SB may be disposed in the support layer SPL. Each of the support bars SB may extend in the extension direction of the rolling axis, such as to have a major dimension parallel to the rolling axis, without being limited thereto. The support bars SB may be arranged in a direction crossing the extension direction. For example, as illustrated in FIGS. 2A and 2B, the support bars SB, each of which extends in the second direction DR2, may be arranged in the support layer SPL to be spaced apart from each other in the first direction DR1.

The support layer SPL may cover the support bars SB. In an embodiment, the support layer SPL may make contact with the support bars SB. The integral support layer SPL may cover the top and bottom surfaces of the support bars SB. The integral support layer SPL may fill the spaces between the support bars SB spaced apart from each other in the first direction DR1, and the support layer SPL may connect the support bars SB spaced apart from each other, to each other within the support member MSP. That is, the support layer SPL and the support bars SB may move together with each other, as well as together with other components like the display module DM, the handle HND, the support part SUP, etc. As covering the support bars SB, the support layer SPL may extend along an entirety of the top and bottom surfaces of the support bars SB, together with extending along sidewalls of the support bars SB at the spaces therebetween.

The modulus of each of the support bars SB may be higher than the modulus of the support layer SPL. That is, the modulus of one support bar SB may be higher than the modulus of the support layer SPL. The support bars SB may contain (or include) a material having a higher stiffness than a stiffness of the support layer SPL. The support bars SB may support the display module DM and may improve the impact resistance of the support member MSP.

The support layer SPL may contain a material having a flexibility which is greater than a flexibility of the support bars SB. The support layer SPL may connect the support bars SB spaced apart from each other, to each other within the support member MSP, and may allow the support member MSP to be easily curvable with a curvature. The support layer SPL may cover the support bars SB and may provide a flat upper surface which is closest to the display module DM and along which the display module DM extends in the first direction DR1 and/or the second direction DR2. Accordingly, the support layer SPL may improve the surface shape and quality of the display module DM, both within the housing HS and at exposed portions which are outside of the housing HS.

Figure 3:
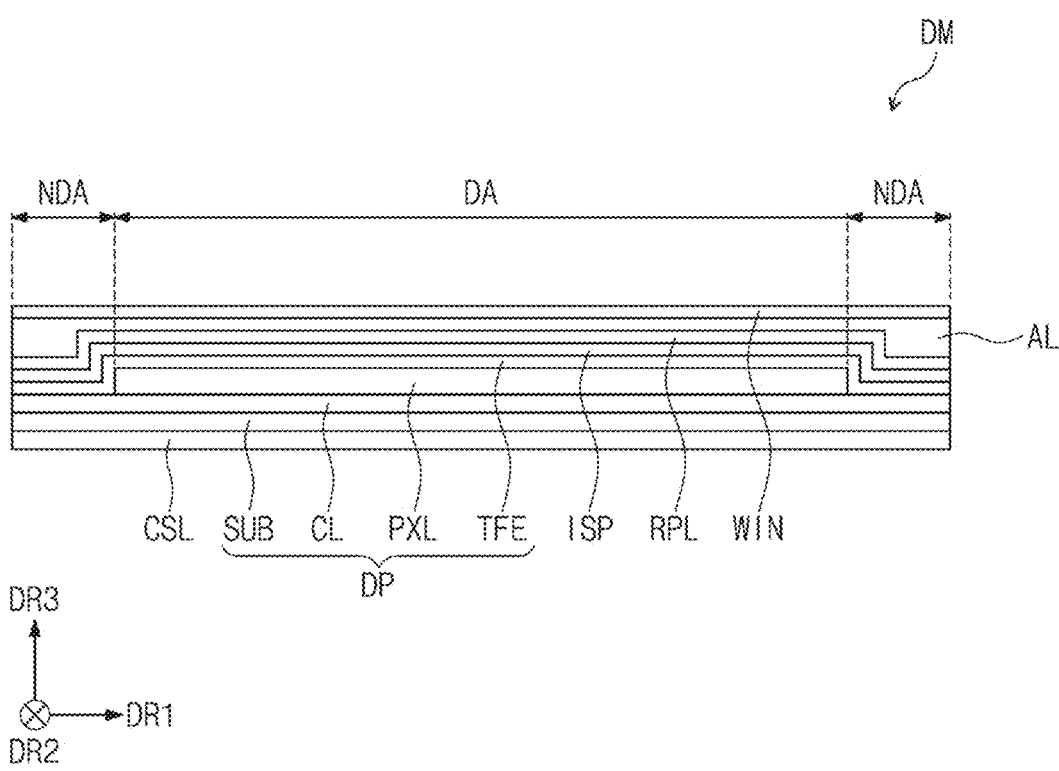
FIG. 3 is a sectional view of a display module according to an embodiment of the present disclosure.

FIG. 3 is a sectional view of a display module DM according to an embodiment of the present disclosure. Referring to FIG. 3, the display module DM may include a display panel DP, an input sensing layer ISP, an anti-reflection layer RPL, a window WIN, an adhesive layer AL, and a lower member CSL.

The display panel DP may be a flexible display panel. The display panel DP according to an embodiment of the present disclosure may be an emissive display panel which generates and/or emits light, and is not particularly limited. For example, the display panel DP may be an organic light emitting display panel or an inorganic light emitting display panel. An emissive layer of the organic light emitting display panel may contain an organic light emitting material. An emissive layer of the inorganic light emitting display panel may contain an inorganic light emitting material such as quantum dots, quantum rods, or the like.

The display panel DP may include a base substrate SUB, a circuit layer CL, a display element layer PXL, and an encapsulation layer TFE. The base substrate SUB, the circuit layer CL, the display element layer PXL, and the encapsulation layer TFE may be sequentially stacked in the third direction DR3.

The base substrate SUB may include a display area DA and a peripheral area NDA and may correspond to the display area DA and the peripheral area NDA of the above-described display module DM. The base substrate SUB may provide a base surface on which the circuit layer CL is disposed.

The base substrate SUB may include a flexible plastic substrate. For example, the base substrate SUB may include at least one synthetic resin layer. The synthetic resin layer of the base substrate SUB may contain at least one of an acrylate-based resin, a methacrylate-based resin, a polyiso-prene-based resin, a vinyl-based resin, an epoxy-based resin, a urethane-based resin, a cellulose-based resin, a siloxane-based resin, a polyamide-based resin, a perylene-based resin and a polyimide-based resin. However, the material of the base substrate SUB is not limited to the aforementioned examples.

The circuit layer CL may be disposed on the base sub-strate SUB. The circuit layer CL may include at least one insulating layer, drive elements, signal lines, and signal pads. The circuit layer CL may include a conductive pattern and a semiconductor pattern that form the drive elements, the signal lines, and the signal pads. The drive elements, the signal lines, and the signal pads included in the circuit layer CL may be formed (or provided) by forming an insulating layer, a semiconductor layer, and a conductive layer on the base substrate SUB by coating or deposition and selectively patterning the insulating layer, the semiconductor layer, and the conductive layer through photolithography.

The display element layer PXL may be disposed on the circuit layer CL. The display element layer PXL may include light emitting elements disposed to overlap the display area DA. The light emitting elements of the display element layer PXL may be electrically connected to the drive elements of the circuit layer CL and may output light through the display area DA depending on signals (e.g., electrical signals) of the drive elements.

The encapsulation layer TFE may be disposed on the display element layer PXL and may encapsulate the light emitting elements. The encapsulation layer TFE may include a plurality of thin films. The thin films of the encapsulation layer TFE may be disposed to improve the optical efficiency of the light emitting elements or protect the light emitting elements. In an embodiment, the encapsulation layer TFE may include at least one inorganic film and at least one organic film. The inorganic film of the encapsulation layer TFE may protect the light emitting elements from moisture/oxygen. The organic film of the encapsulation layer TFE may protect the light emitting elements from foreign matter such as dust particles.

The input sensing layer ISP may be disposed on the display panel DP. The input sensing layer ISP may be directly disposed on the display panel DP without a separate adhesive member. As being directly disposed or in contact, elements may form an interface therebetween, without being limited thereto. That is, after the display panel DP is formed, the input sensing layer ISP may be formed through a continuous process on a base surface provided by the display panel DP. For example, the input sensing layer ISP may be directly disposed on the encapsulation layer TFE. However, without being limited thereto, the input sensing layer ISP may be manufactured (or provided) in a panel form through a separate manufacturing process distinguished from a manufacturing process of the display panel DP, and may be attached onto the display panel DP by an adhesive member.

The input sensing layer ISP may sense an external input applied from outside the display device DD (refer to FIG.

1A) and may obtain coordinate information of the external input. The input sensing layer ISP may be driven in various ways, such as a capacitive detecting method, a resistive detecting method, an infrared detecting method, or a pressure detecting method, but is not limited thereto.

The anti-reflection layer RPL may be disposed on the input sensing layer ISP. The anti-reflection layer RPL may be directly disposed on the input sensing layer ISP. However, without being limited thereto, the anti-reflection layer RPL may be attached onto the input sensing layer ISP by a separate adhesive member.

The anti-reflection layer RPL may decrease the reflectivity of external light incident from above the display device DD (refer to FIG. 1A). The anti-reflection layer RPL may include various embodiments that reduce the reflectivity of external light.

In an embodiment, the anti-reflection layer RPL may include a phase retarder and/or a polarizer. The phase retarder may include a $\lambda/2$ phase retarder and/or a $\lambda/4$ phase retarder. The polarizer may include a film type polarizer or a liquid crystal coating type polarizer. The film type polarizer may include a stretchable synthetic resin film, and the liquid crystal coating type polarizer may include liquid crystals arranged in a predetermined arrangement. However, without being limited thereto, the phase retarder and the polarizer may be implemented in the form of one polarizer film.

In an embodiment, the anti-reflection layer RPL may include color filters. The color filters may be disposed to correspond to the arrangement and light emission colors of pixels PX included in the display panel DP. The color filters may filter external light incident from the outside in the same colors as the light emission colors of the pixels PX. The anti-reflection layer RPL may further include a black matrix disposed adjacent to the color filters.

In an embodiment, the anti-reflection layer RPL may include a destructive interference structure. For example, the destructive interference structure may include a first reflective layer and a second reflective layer that are disposed on different layers. First reflected light reflected by the first reflective layer and second reflected light reflected by the second reflective layer may destructively interfere with each other, and thus the anti-reflection layer RPL may decrease the reflectivity of external light.

The adhesive layer AL may be disposed on the anti-reflection layer RPL. The adhesive layer AL may be disposed between the anti-reflection layer RPL and the window WIN and may combine the anti-reflection layer RPL and the window WIN to each other. The adhesive layer AL may include a transparent adhesive, such as an optically clear adhesive (OCA) film, an optically clear resin (OCR), or a pressure sensitive adhesive (PSA) film. However, the type of adhesive included in the adhesive layer AL is not limited thereto.

The window WIN may be disposed on the anti-reflection layer RPL. The window WIN may cover the display panel DP, the input sensing layer ISP, and the anti-reflection layer RPL and may protect components of the display module DM from external impact and a scratch.

The window WIN may contain an optically transparent insulating material. For example, the window WIN may contain glass, sapphire, or a polymer. The window WIN may have a single-layer structure or a multi-layer structure. The window WIN may further include at least one functional layer, such as an anti-fingerprint layer, a phase control layer, and a hard coating layer, which are disposed on an optically transparent substrate.

The lower member CSL may be disposed on the rear surface of the display panel DP. The lower member CSL may be attached to the rear surface of the display panel DP by an adhesive member. However, without being limited thereto, the lower member CSL may be directly formed on the rear surface of the display panel DP. The lower member CSL may include at least one of a protective film layer and an impact absorbing layer that protects the display panel DP from external impact.

The protective film layer of the lower member CSL may contain a flexible polymer material such as polyethylene terephthalate or polyimide. The impact absorbing layer of the lower member CSL may contain a sponge, expanded foam, or a urethane resin and may absorb impact applied to the display panel DP. The lower member CSL is not limited to any one as long as the lower member CSL is capable of protecting the display panel DP from elements or damage incident to the display module DM from outside thereof.

Figure 4:
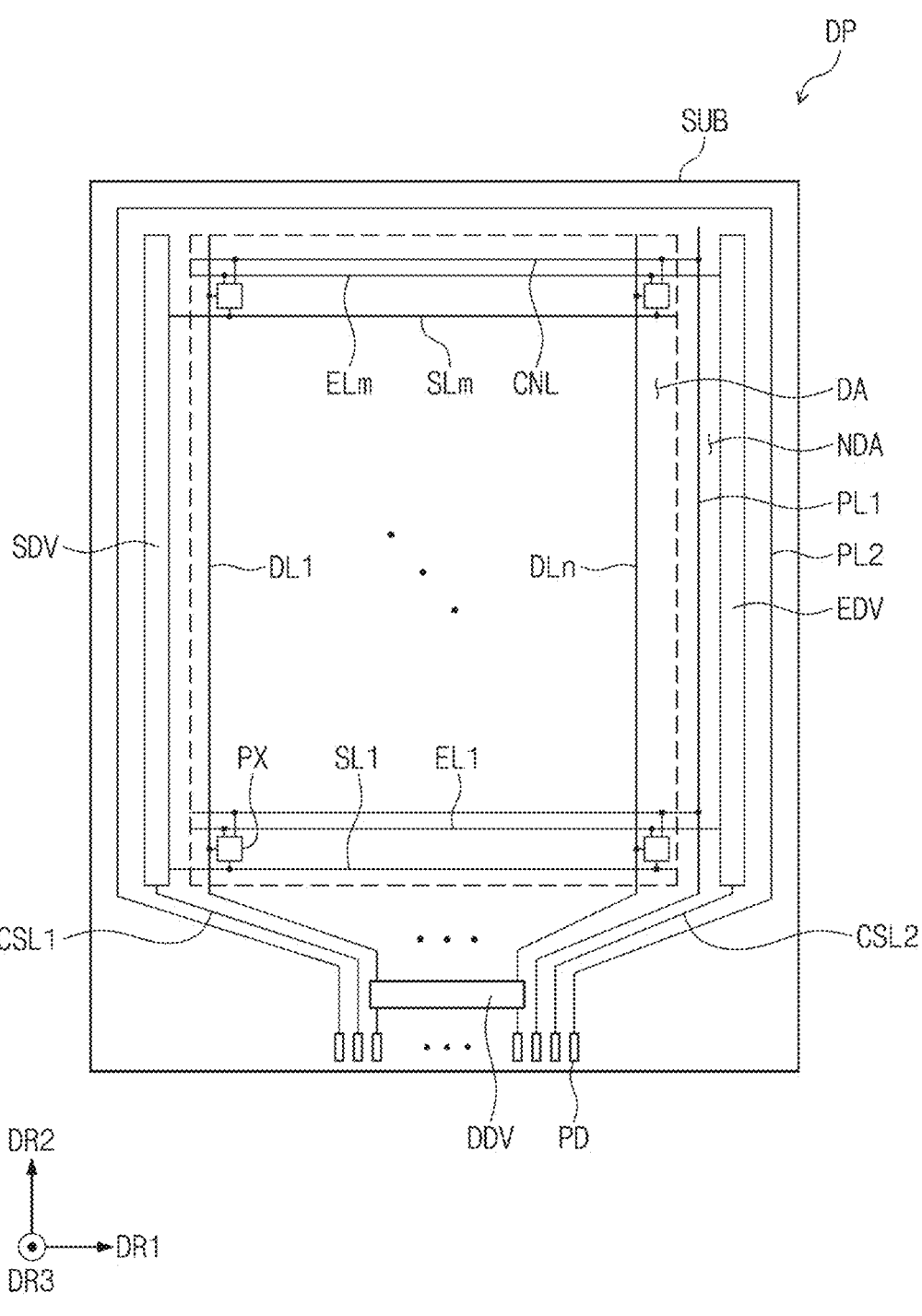
FIG. 4 is a plan view of a display panel according to an embodiment of the present disclosure.

FIG. 4 is a plan view of a display panel DP according to an embodiment of the present disclosure. FIG. 4 schematically illustrates components of the display panel DP on a plane.

Referring to FIG. 4, the display panel DP may include the base substrate SUB, a plurality of pixels PX, a plurality of signal lines SL1 to SLm, DL1 to DLn, EL1 to ELm, CSL1, CSL2, PL1, PL2, and CNL, a scan driver SDV, a data driver DDV, and a light emission driver EDV.

The base substrate SUB may include the display area DA and the peripheral area NDA as described above. The base substrate SUB may provide a base surface on which electrical elements and lines of the display panel DP are disposed. In FIG. 4, the base substrate SUB having a rectangular shape parallel to the first direction DR1 and the second direction DR2 on the plane is illustrated. However, without being limited thereto, the base substrate SUB may have various shapes depending on the structure of the display device DD (refer to FIG. 1A).

Each of the pixels PX may include a light emitting element and a pixel drive circuit that includes a plurality of transistors (e.g., a switching transistor and a drive transistor) which is connected to the light emitting element and at least one capacitor. The pixels PX may emit light in response to electrical signals applied to the pixels PX.

The pixels PX may be disposed in the display area DA. However, without being limited thereto, some of the pixels PX may include the transistor disposed in the peripheral area NDA.

The scan driver SDV, the data driver DDV, and the light emission driver EDV may be disposed in the peripheral area NDA. However, without being limited thereto, at least one of the scan driver SDV, the data driver DDV, or the light emission driver EDV may overlap the display area DA, and thus the area of the peripheral area NDA may be decreased so that the bezel area (e.g., planar area at an outer edge) of the display device DD (refer to FIG. 1A) may be reduced.

The data driver DDV may be provided in the form of an integrated circuit chip defined as a driver chip and may be mounted on the peripheral area NDA of the display panel DP. However, without being limited thereto, the data driver DDV may be mounted on a separate flexible circuit board connected to the display panel DP and may be electrically connected to the display panel DP.

The plurality of signal lines SL1 to SLm, DL1 to DLn, EL1 to ELm, CSL1, CSL2, PL1, PL2, and CNL may include the scan lines SL1 to SLm, the data lines DL1 to DLn, the light emission lines EL1 to ELm, the first and second control lines CSL1 and CSL2, the first and second power lines PL1 and PL2, and the connecting lines CNL. Here, "m" and "n" are natural numbers.

The scan lines SL1 to SLm may extend in the first direction DR1 and may be connected to the scan driver SDV. The data lines DL1 to DLn may extend in the second direction DR2 and may be connected to the data driver DDV. The light emission lines EL1 to ELm may extend in the first direction DR1 and may be connected to the light emission driver EDV.

The first power line PL1 may extend in the second direction DR2 and may be disposed in the peripheral area NDA. The first power line PL1 may be disposed between the display area DA and the light emission driver EDV. However, without being limited thereto, the first power line PL1 may be disposed between the display area DA and the scan driver SDV.

The connecting lines CNL may extend in the first direction DR1. The connecting lines CNL may be arranged in the second direction DR2 and may be connected to the first power line PL1 and the pixels PX. The connecting lines CNL may be disposed on a different layer from the first power line PL1 and may be electrically connected with the first power line PL1 through a contact hole. However, without being limited thereto, the connecting lines CNL may be integrally formed with the first power line PL1 on the same layer. A first voltage may be applied to the pixels PX through the first power line PL1 and the connecting lines CNL connected with each other. As being on a same layer, elements may be formed in a same process and/or as including a same material, elements may be in a same layer as each other as respective portions of a same material layer, may form an interface with a same underlying or overlying layer, etc., without being limited thereto.

The second power line PL2 may be disposed in the peripheral area NDA. The second power line PL2 may be disposed outward of the scan driver SDV and the light emission driver EDV. Although not separately illustrated, the second power line PL2 may extend toward the display area DA and may be connected to the pixels PX. A second voltage having a lower level than the first voltage may be applied to the pixels PX through the second power line PL2. The first voltage and the second voltage may be applied to electrodes of the light emitting elements of the pixels PX. Due to this, the light emitting elements may generate and emit light.

The first control line CSL1 may be connected to the scan driver SDV. The second control line CSL2 may be connected to the light emission driver EDV.

Pads PD may be disposed adjacent to a lower end of the peripheral area NDA. The pads PD may be disposed closer to the lower end of the display panel DP than the data driver DDV. The pads PD may be arranged in the first direction DR1. The display device DD (refer to FIG. 1A) may include a circuit board that includes a timing controller for controlling operations of the scan driver SDV, the data driver DDV, and the light emission driver EDV and a voltage generator for generating a voltage, and the pads PD may be portions to which the circuit board of the display device DD (refer to FIG. 1A) is connected. Electrical signals may be input to the display panel DP from outside thereof, at the pads PD.

Each of the pads PD may be connected to a corresponding signal line among the signal lines. The first and second power lines PL1 and PL2 and the first and second control lines CSL1 and CSL2 may be connected to the pads PD. The data lines DL1 to DLn may be connected to corresponding pads PD through the data driver DDV. For example, the data lines DL1 to DLn may be connected to the data driver DDV, and the data driver DDV may be connected to the pads PD corresponding to the data lines DL1 to DLn.

The scan driver SDV may generate scan signals in response to a scan control signal. The scan signals may be applied to the pixels PX through the scan lines SL1 to SLm. The data driver DDV may generate data voltages corresponding to image signals in response to a data control signal. The data voltages may be applied to the pixels PX through the data lines DL1 to DLn. The light emission driver EDV may generate light emission signals in response to a light emission control signal. The light emission signals may be applied to the pixels PX through the light emission lines EL1 to ELm.

The pixels PX may receive the data voltages in response to the scan signals. The pixels PX may display an image IM by emitting light having luminance corresponding to the data voltages in response to the light emission signals. Light emission time of the pixels PX may be controlled by the light emission signals. The display panel DP may output an image IM through the display area DA by the pixels PX.

Figure 5A:
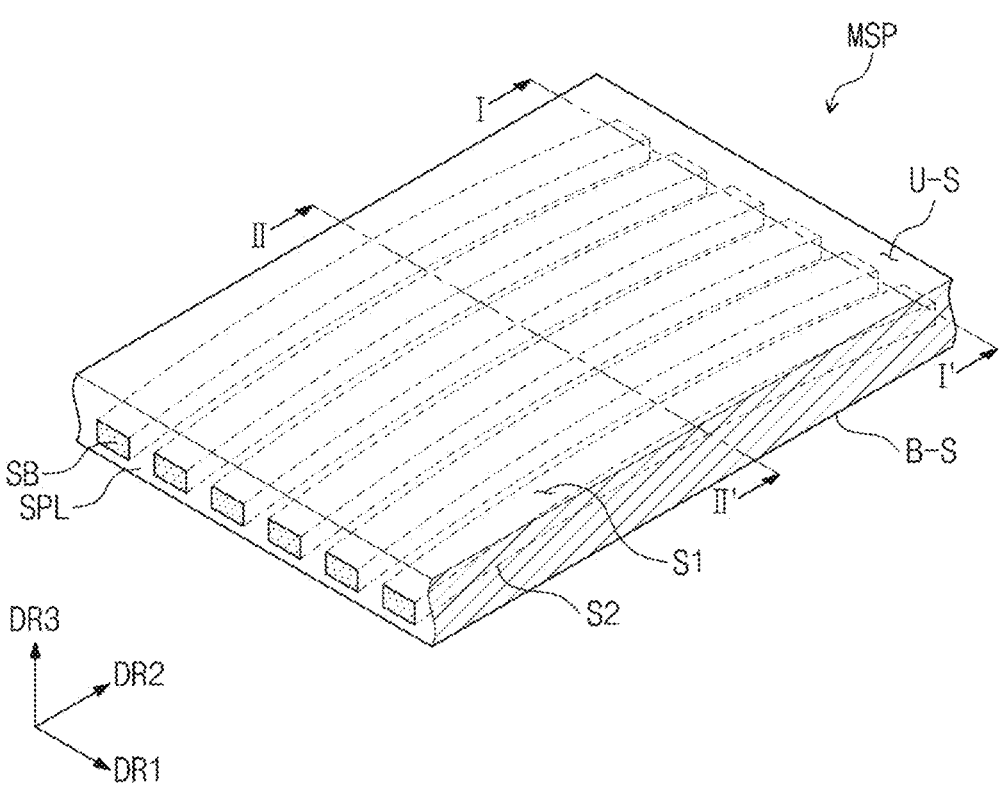
FIG. 5A is a perspective view of a support member according to an embodiment of the present disclosure.
Figure 5B:
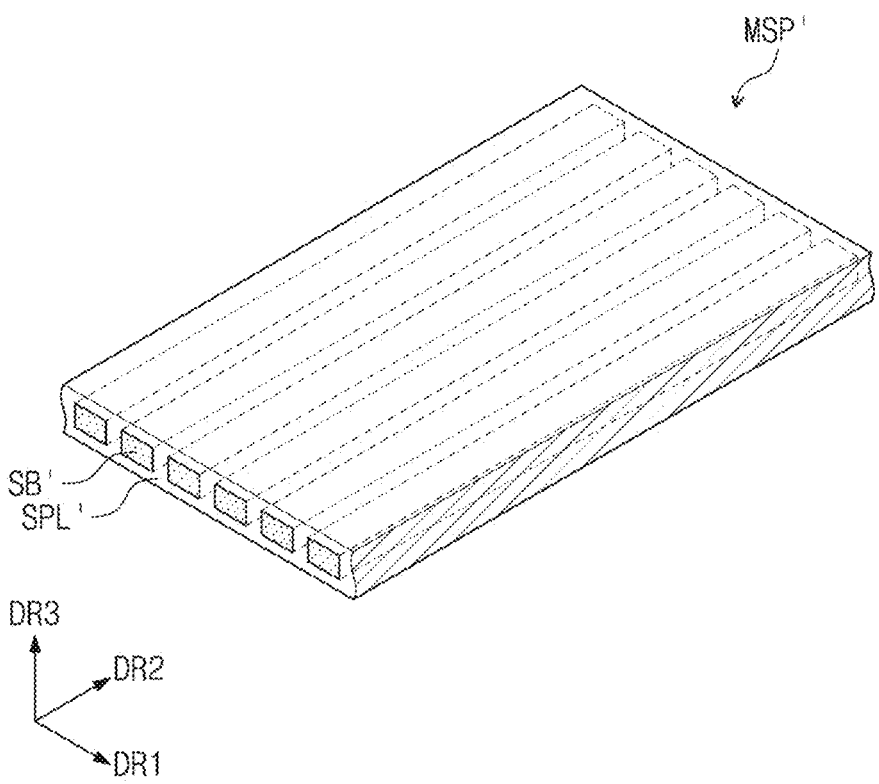
FIG. 5B is a perspective view of a support member according to a comparative example.

FIG. 5A is a perspective view of a support member MSP according to an embodiment of the present disclosure. FIG. 5B is a perspective view of a support member MSP' according to a comparative example. FIG. 5A illustrates a perspective view corresponding to a portion of the support member MSP according to the embodiment, and FIG. 5B illustrates a perspective view corresponding to a portion of the support member MSP' according to the comparative example.

Figure 6A:
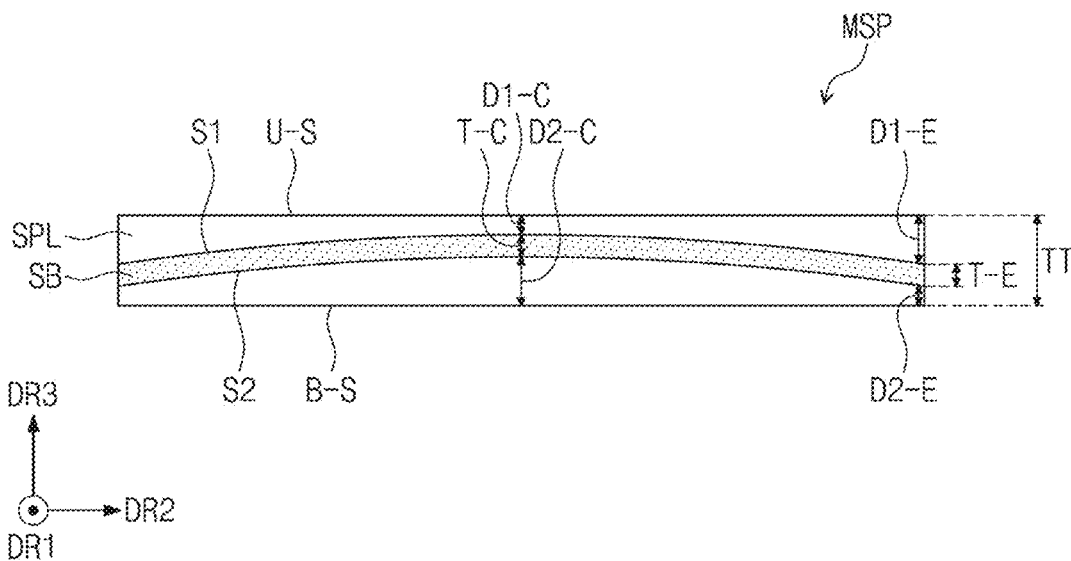
FIG. 6A is a sectional view of the support member according to the embodiment of the present disclosure.
Figure 6B:
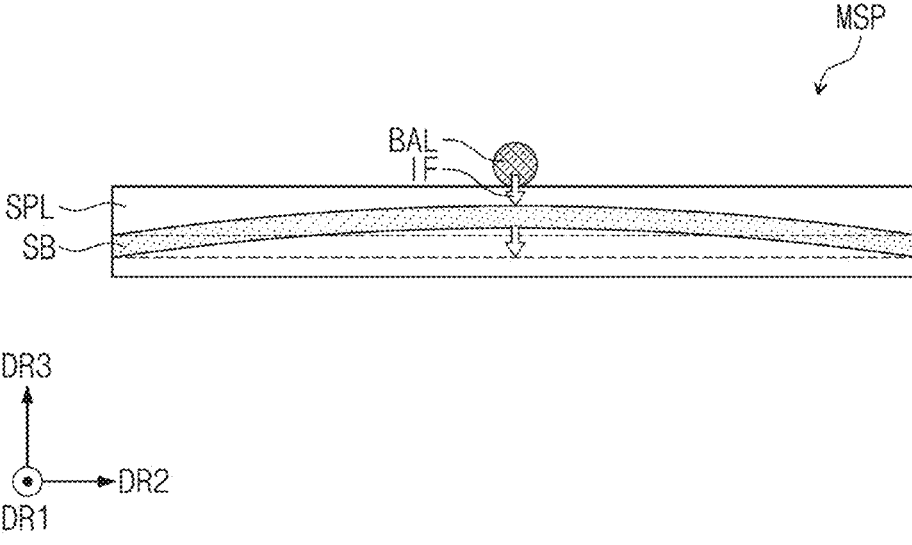
FIG. 6B is a sectional view illustrating a ball drop on the support member according to the embodiment of the present disclosure.
Figure 6C:
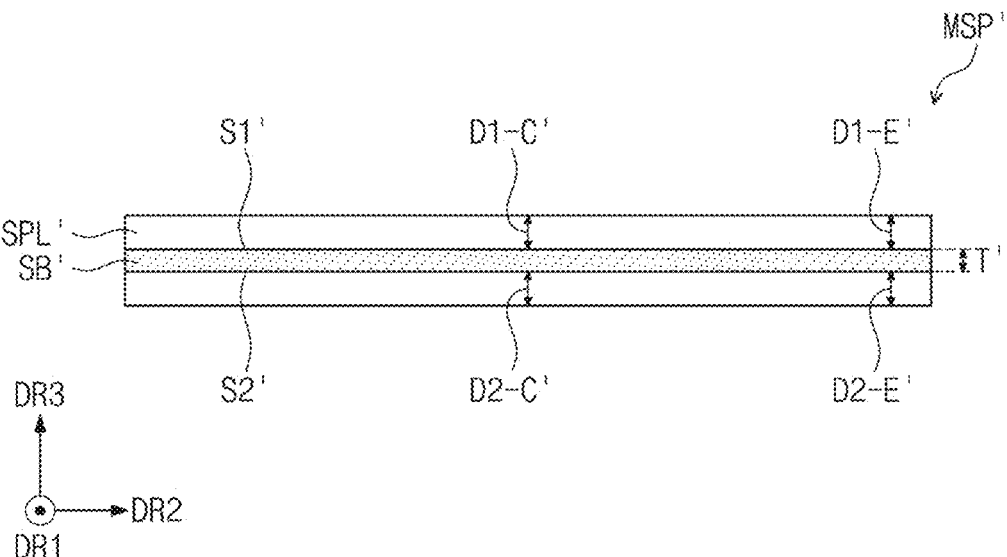
FIG. 6C is a sectional view of the support member according to the comparative example.

FIG. 6A is a sectional view of the support member MSP according to the embodiment of the present disclosure. FIG. 6B is a schematic sectional view illustrating a ball drop on the support member MSP of FIG. 6A. FIG. 6C is a sectional view of the support member MSP' according to the comparative example. FIGS. 6A to 6C may correspond to a section of the support member MSP of FIG. 5A and a section of the support member MSP' of FIG. 5B as viewed in the first direction DR1.

Figure 7A:
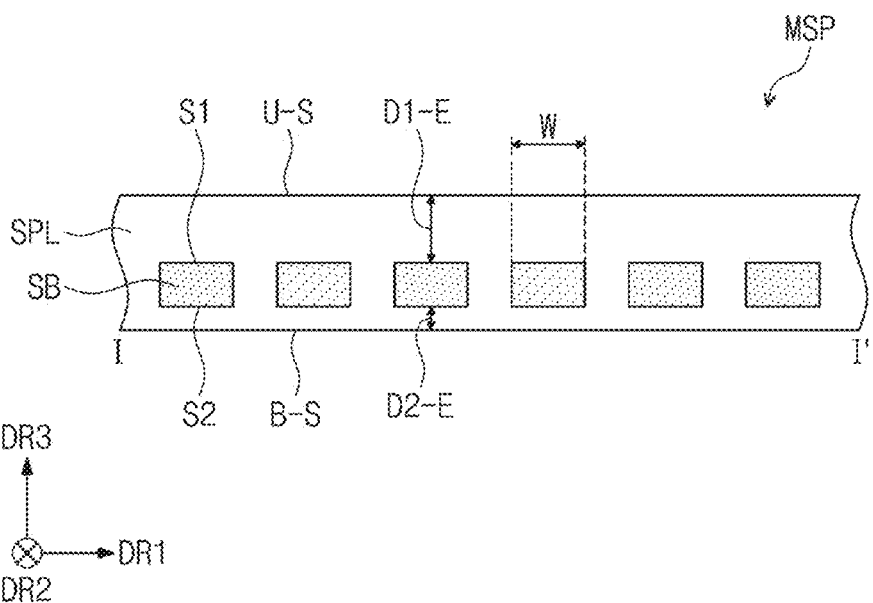
FIG. 7A is a sectional view of the support member according to the embodiment of the present disclosure corresponding to line I-I' of FIG. 5A.
Figure 7B:
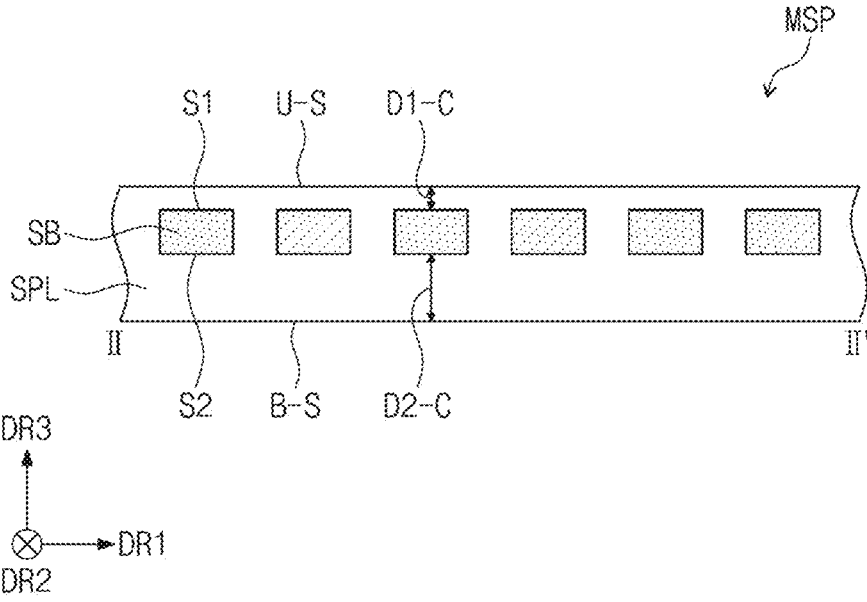
FIG. 7B is a sectional view of the support member according to the embodiment of the present disclosure corresponding to line II-IF of FIG. 5A.

FIG. 7A is a sectional view of the support member MSP according to the embodiment corresponding to line I-I' of FIG. 5A. FIG. 7B is a sectional view of the support member MSP according to the embodiment corresponding to line II-IF of FIG. 5A.

Referring to FIGS. 5A and 6A, the support member MSP may include a support layer SPL and support bars SB. The support layer SPL may cover the support bars SB. The support layer SPL may be integrally formed and may connect the support bars SB spaced apart from each other.

The support layer SPL may include an upper surface U-S parallel to the first direction DR1 and the second direction DR2 and a lower surface B-S opposite to the upper surface U-S. The upper surface U-S and the lower surface B-S of the support layer SPL may be substantially parallel to each other. Accordingly, the gap between the upper surface U-S and the lower surface B-S of the support layer SPL may be substantially uniform.

The gap between the upper surface U-S and the lower surface B-S of the support layer SPL may correspond to a first thickness TT of the support layer SPL, and the first thickness TT of the support layer SPL may be uniform in the area in which the display module DM (refer to FIG. 1A) is disposed. The first thickness TT of the support layer SPL may correspond to a thickness of the support member MSP. Accordingly, the support member MSP according to the embodiment may have a substantially uniform thickness to correspond to the area in which the display module DM (refer to FIG. 1A) is disposed.

The support layer SPL having the uniform first thickness TT may provide the flat upper surface U-S and the flat lower surface B-S to both the areas in which the support bars SB are disposed and the areas corresponding to the separation spaces between the support bars SB. As the display module DM (refer to FIG. 1A) is disposed on the flat upper surface U-S of the support layer SPL, portions of the display module DM (refer to FIG. 1A) disposed to overlap the separation spaces between the support bars SB may remain flat without being deformed. That is, the surface quality (or planar shape) of the display module DM may be improved by the support layer SPL.

The support layer SPL may contain an elastomer having an elastic force. For example, the support layer SPL may contain at least one of thermoplastic polyurethane, silicone, thermoplastic rubbers, elastolefin, thermoplastic olefin, polyamide, polyether block amide, synthetic polyisoprene, polybutadiene, chloroprene rubber, butyl rubber, styrene-butadiene, epichlorohydrin rubber, polyacrylic rubber, silicone rubber, fluorosilicone rubber, fluoroelastomers and ethylene-vinyl acetate.

The support bars SB may extend in the second direction DR2 parallel to the rolling axis. The support bars SB may be spaced apart from each other in the first direction DR1 crossing the extension direction of the support bars SB. The support bars SB may be disposed with the same interval therebetween in the first direction DR1. However, the intervals between the support bars SB are not limited thereto.

The support bars SB may have a stiffness. For example, the support bars SB may contain metal or carbon fibers. The support bars SB may contain aluminum, stainless steel, invar, or carbon fiber reinforced plastic (CFRP). In an embodiment, the support bars SB may contain metal that is attracted to a magnet.

Each of the support bars SB may have a higher modulus than the support layer SPL. In an embodiment, the support layer SPL may have a modulus of about 10 kilopascals (KPa) to about 20 megapascals (MPa). Specifically, the modulus of the support layer SPL may range from about 10 KPa to about 100 KPa. In an embodiment, the support bars SB may have a modulus of about 1 gigapascal (GPa) to about 500 gigapascals (GPa). Specifically, the modulus of the support bars SB may range from about 50 GPa to about 200 GPa. The support bars SB having a relatively high modulus may support the display module DM (refer to FIG. 1A) and may improve the impact resistance of the support member MSP.

On a section viewed in the first direction DR1 crossing the extension direction of the support bars SB, each of the support bars SB may include a curved surface that extends in the second direction DR2 and is convex upward toward the display module DM. Specifically, the support bar SB may include a first surface S1 adjacent to (e.g., closest to) the upper surface U-S of the support layer SPL and a second surface S2 opposite to the first surface S1. The first surface S1 and the second surface S2 may be curved surfaces that are bent upward in the third direction DR3. That is, on the section viewed in the first direction DR1, each of the first surface S1 and the second surface S2 may include long sides (e.g., a major dimension) extending in the second direction DR2 and having a curve convex toward the upper surface U-S of the support layer SPL. The first surface S1 and the second surface S2 may be non-parallel to the upper surface U-S of the support layer SPL.

Each of the first surface S1 and the second surface S2 may include a curved surface extending in the second direction DR2 and having a center of curvature defined under the support bar SB. Based on the normal directions of the surfaces, the first surface S1 having a normal line facing upward may be a convex surface, and the second surface S2 having a normal line facing downward may be a concave surface.

The display module DM (refer to FIG. 3) including the display panel DP (refer to FIG. 3) may be disposed on the support member MSP, and each of the first surface S1 and the second surface S2 may include a curved surface that is convex toward the display panel DP (refer to FIG. 3).

The first surfaces S1 of the support bars SB may correspond to the top surfaces of the support bars SB, and the second surfaces S2 of the support bars SB may correspond to the bottom surfaces of the support bars SB. Accordingly, the top surface and the bottom surface of each of the support bars SB may include a curved surface that is curved in the extension direction of the support bars SB.

The support bars SB may be disposed in the support layer SPL. On the section, the support bars SB may be disposed between the upper surface U-S and the lower surface B-S of the support layer SPL. That is, on the section viewed in the first direction DR1, the first surface S1 and the second surface S2 of each of the support bars SB may be located between the upper surface U-S and the lower surface B-S of the support layer SPL. The first surface S1 and the second surface S2 of each of the support bars SB may make contact with the support layer SPL. The first surface S1 and the second surface S2 of each of the support bars SB may be spaced apart from the upper surface U-S and the lower surface B-S of the support layer SPL.

Opposite ends of the support bar SB that face away from each other in the second direction DR2 may be exposed to the outside of the support layer SPL. However, without being limited thereto, the opposite ends of the support bar SB may be disposed in the support layer SPL and a portion of the support layer SPL may be disposed at all sides of the support bars SB. That is, as covering the support bars SB, the support layer SPL may extend along an entirety of the top and bottom surfaces of the support bars SB, together with extending along sidewalls of the support bars SB at the spaces therebetween and along outer end surfaces at the opposite ends of the support bars SB.

The gap between the first surface S1 and the second surface S2 of the support bar SB in the third direction DR3 may correspond to a second thickness of the support bar SB. Based on one support bar SB, the gap between the first surface S1 and the second surface S2 of the support bar SB may be substantially uniform. That is, the support bar SB may have a uniform second thickness in the second direction DR2. Accordingly, the end thickness T-E at an end of the support bar SB may be substantially the same as the center thickness T-C at the center of the support bar SB which is at a center along a length of the support bar (e.g., length along the second direction DR2).

The curvature of the first surface S1 of the support bar SB may be substantially the same as the curvature of the second surface S2. That is, the first surface S1 of the support bar SB may be parallel to the second surface S2. However, embodiments are not necessarily limited thereto.

Due to the first surface S1 having a curved surface, the gap between the flat upper surface U-S of the support layer SPL and the first surface S1 of the support bar SB may vary depending on positions along a length of the support bar SB. As the first surface S1 has a curved surface convex upward, the first upper gap D1-C between the first surface S1 of the support bar SB and the upper surface U-S of the support layer SPL at a location corresponding to the center of the support bar SB may be smaller than the second upper gap D1-E between the first surface S1 of the support bar SB and the upper surface U-S of the support layer SPL at a location corresponding to the end of the support bar SB. Accordingly, an upper gap between the first surface S1 of the support bar SB and the upper surface U-S of the support layer SPL may be gradually decreased in a direction from the end of the support bar SB toward the center of the support bar SB. That is, the upper gap between the first surface S1 of the support bar SB and the upper surface U-S of the support layer SPL may correspond to an upper thickness (or an upper thickness portion) of the support layer SPL, and the upper thickness of the support layer SPL may be gradually decreased in the direction from the end of the support bar SB toward the center of the support bar SB.

Likewise, due to the second surface S2 having a curved surface, the lower gap between the lower surface B-S of the support layer SPL and the second surface S2 of the support bar SB may vary depending on areas (e.g., locations along a length of the support bar SB). As the second surface S2 has a curved surface concave upward, the first lower gap D2-C between the second surface S2 of the support bar SB and the lower surface B-S of the support layer SPL at a location corresponding to the center of the support bar SB may be greater than the second lower gap D2-E between the second surface S2 of the support bar SB and the lower surface B-S of the support layer SPL at a location corresponding to the end of the support bar SB. Accordingly, the lower gap between the second surface S2 of the support bar SB and the lower surface B-S of the support layer SPL may be gradually increased in a direction from the end of the support bar SB toward the center of the support bar SB. That is, the lower gap between the second surface S2 of the support bar SB and the lower surface B-S of the support layer SPL may correspond to a lower thickness (e.g., a lower thickness portion) of the support layer SPL, and the lower thickness of the support layer SPL may be gradually increased in the direction from the end of the support bar SB toward the center of the support bar SB.

Due to the first surface S1 and the second surface S2, the upper thickness of the support layer SPL disposed above the support bar SB and the lower thickness of the support layer SPL disposed under the support bar SB may differ from each other on the section viewed in the extension direction of the support bars SB. FIGS. 7A and 7B illustrate sections of the support member MSP as viewed in the second direction DR2 that is the extension direction of the support bars SB.

FIG. 7A is a sectional view of the support member MSP corresponding to ends of the support bars SB as viewed in the second direction DR2. Referring to FIG. 7A, in the area (or location) corresponding to the ends of the support bars SB, the second upper gap D1-E between the first surface S1 of the support bar SB and the upper surface U-S of the support layer SPL may be greater than the second lower gap D2-E between the second surface S2 of the support bar SB and the lower surface B-S of the support layer SPL. That is, in the area corresponding to the ends of the support bars SB, the upper thickness of the support layer SPL may be greater than the lower thickness of the support layer SPL.

The support bars SB may have the same width W in the first direction DR1. However, without being limited thereto, some of the support bars SB may have different widths W.

FIG. 7B is a sectional view of the support member MSP corresponding to the centers of the support bars SB as viewed in the second direction DR2. Referring to FIG. 7B, in the area corresponding to the centers of the support bars SB, the first upper gap D1-C between the first surface S1 of the support bar SB and the upper surface U-S of the support layer SPL may be smaller than the first lower gap D2-C between the second surface S2 of the support bar SB and the lower surface B-S of the support layer SPL. That is, in the area (or location) corresponding to the centers of the support bars SB, the upper thickness of the support layer SPL may be smaller than the lower thickness of the support layer SPL.

As the support bars SB include curved surfaces curved upward in the extension direction as illustrated in FIG. 6A, the time during which an impact force is applied and supported by the support member MSP may be increased, and thus the support bars SB may reduce impulse applied from the outside. In consequence, as the support bars SB include the curved surfaces curved upward in the extension direction to be biased toward the display panel DP, the support bars SB may improve the impact resistance of the support member MSP and may prevent damage to the rollable display device DD (refer to FIG. 1A) that is relatively vulnerable to external impact. In this regard, detailed description will be given with reference to FIG. 6B.

Referring to FIG. 6B, in a ball drop test, a ball BAL having a predetermined load may fall onto the support member MSP to apply an impact force IF to the support bar SB. At this time, to lower the impulse applied to the support bar SB, the magnitude of the impact force IF has to be decreased, or the time during which the impact force IF is applied to the support bar SB has to be increased. The time during which the impact force IF is applied to the support bar SB may be increased with an increase in the degree to which the support bar SB having a structure extending in one direction is able to be deformed at the instant when the support bar SB collides with an object, such as the ball BAL, which has a load.

As the support bar SB extends in the second direction DR2 and has a bar shape convex upward on the section viewed in the first direction DR1, the degree to which the support bar SB is able to be deformed or displaced within the support layer SPL from an original convex shape may be increased as illustrated by the dotted line in FIG. 6B at the instant when the impact force IF is applied to the support bar SB. Accordingly, the time during which the impact force IF is applied to the support bar SB may be increased, and the impulse transmitted to the support bar SB may be reduced. The deformation of the support bar SB may be deformation at the moment when the impact force IF is applied, and the support bar SB may return to the original shape (e.g., original convex shape) when the impact force IF is removed.

Referring to FIGS. 5B and 6C, a first surface S1' and a second surface S2' of each of support bars SB' included in the support member MSP' according to the comparative example may be substantially parallel to a comparative upper surface and a comparative lower surface of a support layer SPL'. The first surface S1' and the second surface S2' of the support bar SB' according to the comparative example may be flat surfaces parallel to the first direction DR1 and the second direction DR2. That is, the top surface and the bottom surface of each of the support bars SB' according to the comparative example may be provided as flat surfaces.

The comparative thickness T' of each of the support bars SB' according to the comparative example may have a constant value in the second direction DR2. The second gap D1-E' between the first surface S1' and the comparative upper surface of the support layer SPL' in the area corresponding to ends of the support bars SB' of the comparative example may be substantially the same as the first gap D1-C' between the first surface S1' and the comparative upper surface of the support layer SPL' in the area corresponding to the centers of the support bars SB'. Furthermore, the fourth gap D2-E' between the second surface S2' and the comparative lower surface of the support layer SPL' in the area corresponding to the ends of the support bars SB' of the comparative example may be substantially the same as the third gap D2-C' between the second surface S2' and the comparative lower surface of the support layer SPL' in the area corresponding to the centers of the support bars SB'.

The time during which the impact force IF is applied to the support bars SB' of the comparative example, which have a flat bar shape in the extension direction, at the instant when the impact force IF is applied from the outside may be shorter than the time during which the impact force IF is applied to the support bars SB according to the embodiment of the present disclosure. That is, the degree to which the support bars SB' of the comparative example are able to be deformed at the instant when the impact force IF is applied may be lower than the degree to which the support bars SB according to the embodiment are able to be deformed at the instant when the impact force IF is applied. Accordingly, the impulse applied to the support bars SB' of the comparative example by the same external impact force IF may be larger than the impulse applied to the support bars SB according to the embodiment. Thus, the impact resistance of the support bars SB' of the comparative example may be less than the impact resistance of the support bars SB according to the embodiment.

Table 1 below shows the evaluation result values when the ball drop evaluation of the same load is performed on the display device DD including the support member MSP according to the embodiment of the present disclosure and the comparative display device including the support member MSP' of the comparative example. Here, the evaluation result values are measurements of the drop heights of balls at which the display devices are damaged when the balls having the same load are dropped onto the display devices, and when the ball drop evaluation result value of the comparative example is 100%, the degree of improvement in the ball drop evaluation result value of the embodiment is expressed as a percentage (%).

TABLE 1

| Comparative Example | One Embodiment | |
|---|---|---|
| Entire Area | Central Area | Outer Area |
| 100% | 214% | 128%~157% |

In Table 1, the central area of the one embodiment is an area corresponding to the center of the support bar SB of FIG. 6A described above, and the outer area is an area corresponding to the end of the support bar SB of FIG. 6A described above. Referring to Table 1, it can be seen that the comparative display device of the comparative example has uniform impact resistance in the entire area, but has lower impact resistance than the display device DD of the One Embodiment. Furthermore, it can be seen that the impact resistance of the outer area of the display device DD of the One Embodiment is improved by about 128% to about 157%, compared to that in the comparative example, and it can be seen that the impact resistance of the central area of the display device DD of the One Embodiment is improved by about 214%, compared to that in the comparative example. In addition, it can be seen that the impact resistance of the display device DD of the One Embodiment has different distributions depending on the areas, but is higher in the entire area than the impact resistance in the comparative example. That is, as the support bar SB has a structure to increase the impact force duration time, the impact resistance may be improved in the entire area of the display device DD, compared to that in the comparative example.

Figure 8:
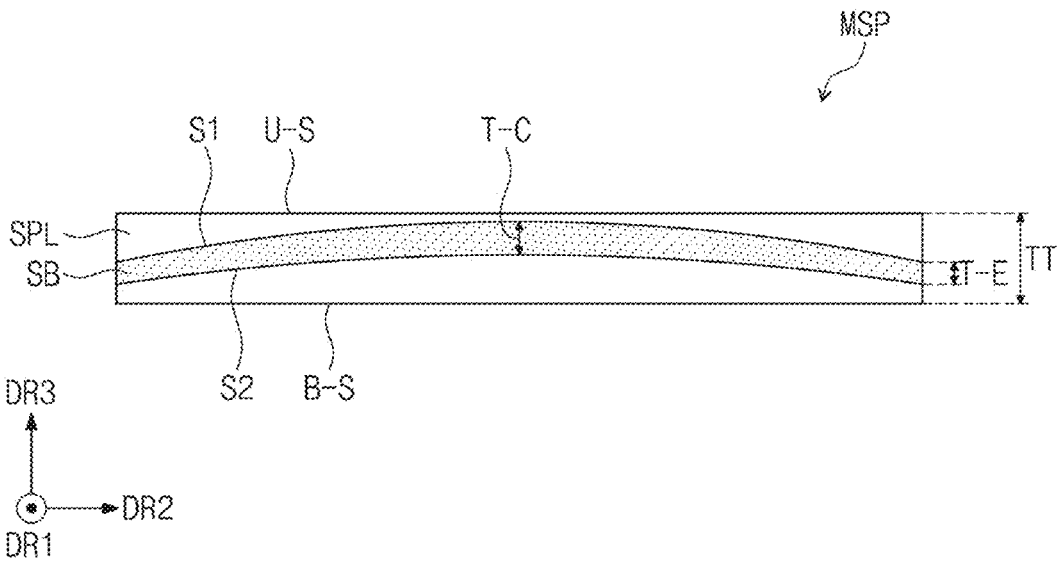
FIG. 8 is a sectional view of a support member according to an embodiment of the present disclosure.

FIG. 8 is a sectional view of a support member MSP according to an embodiment of the present disclosure. The support member MSP illustrated in FIG. 8 includes substantially the same components as the above-described support member MSP, and there is a slight difference in the shape of a support bar SB. The following description will be focused on the difference.

Referring to FIG. 8, a first surface S1 may have a different curvature from a second surface S2. For example, the curvature of the first surface S1 adjacent to an upper surface U-S of a support layer SPL and the display module DM (refer to FIG. 1A) disposed on the upper surface U-S may be greater than the curvature of the second surface S2.

The gap between the first surface S1 and the second surface S2 of the support bar SB may vary depending on areas of the support bar SB. For example, the center thickness T-C of the center of the support bar SB may be greater than the end thickness T-E of an end of the support bar SB. The thickness of the support bar SB may be gradually increased from the end of the support bar SB toward the center of the support bar SB in the second direction DR2, and the central portion of the support bar SB may be the thickest portion in the support bar SB (e.g., define a maximum thickness). Accordingly, the stiffness of one area of the support member MSP that corresponds to the central portions of the support bars SB may be improved.

Figure 9:
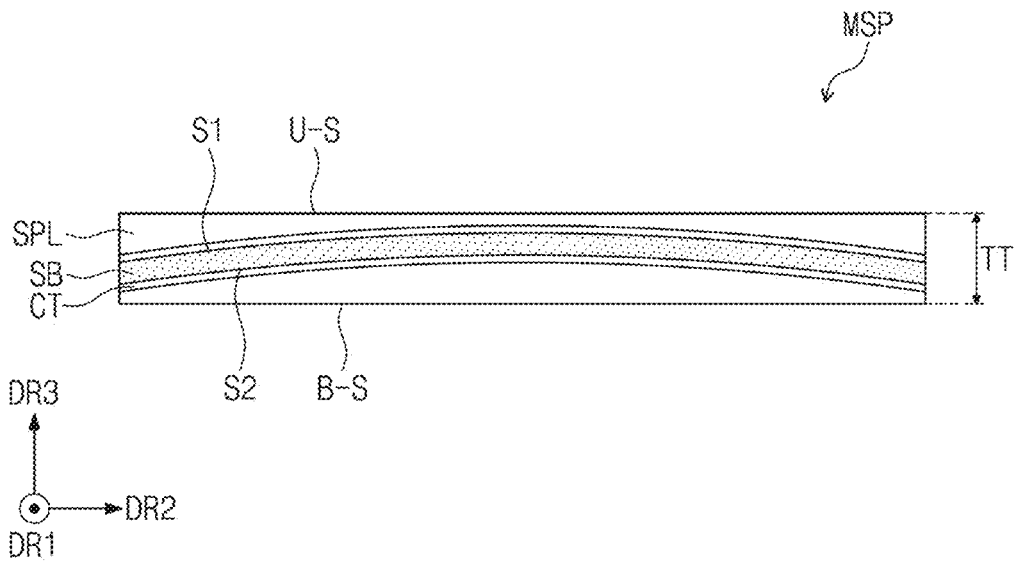
FIG. 9 is a sectional view of a support member according to an embodiment of the present disclosure.

FIG. 9 is a sectional view of a support member MSP according to an embodiment of the present disclosure. The support member MSP illustrated in FIG. 9 includes substantially the same components as the above-described support member MSP, and there is a slight difference in some components. The following description will be focused on the difference.

Referring to FIG. 9, the support member MSP may further include a coating film CT that makes contact with a support bar SB and that covers the support bar SB. The coating film CT may make contact with a first surface S1 and a second surface S2 of the support bar SB and may coat the first surface S1 and the second surface S2. A plurality of coating films CT may be provided. The coating films CT may coat support bars SB, respectively.

The coating film CT may be covered by a support layer SPL. The coating film CT may be disposed between the support layer SPL and the support bar SB on the section. The coating film CT may make contact with the support layer SPL.

Opposite ends of the support bar SB that face away from each other in the second direction DR2 may be exposed to the outside from the coating film CT. However, without being limited thereto, the opposite ends of the support bar SB may be coated by the coating film CT.

The coating film CT may contain a polymer material. For example, the coating film CT may contain at least one of polyimide (PI), polyethylene terephthalate (PET), polycarbonate (PC) and polyamide (PA). However, the material of the coating film CT is not limited to the aforementioned examples.

The coating film CT may have a predetermined modulus. For example, the modulus of the coating film CT may range from about 100 megapascals (MPa) to about 10 GPa. The modulus of the coating film CT may be higher than the modulus of the support layer SPL and may be lower than the modulus of the support bar SB. That is, a modulus of the support member MSP may decrease in a direction from an inner thickness portion (e.g., as defined at the support bar SB), to each of upper surface U-S and the lower surface B-S of the support member MSP. In an embodiment, for example, within the support member MSP, an intermediate modulus thickness portion (e.g., the coating film CT) is between each of the plurality of support bars SB, and the support layer SPL, along a thickness of the support member MSP (e.g., along the third direction DR3), a modulus of the support member MSP is defined at each of the plurality of support bars SB, the intermediate modulus thickness portion and the support layer SPL, and the modulus of the support member MSP decreases along the thickness of the support member MSP, in a direction from the intermediate modulus thickness portion to the support layer SPL.

As the coating film CT has a value between the modulus of the support layer SPL and the modulus of the support bar SB, the coating film CT may decrease the modulus difference between the support layer SPL and the support bar SB. As the modulus difference between the support bar SB and the support layer SPL is increased, strain generated during rolling may be concentrated on the support layer SPL. Accordingly, the strain generated in the support bar SB according to the embodiment may be decreased, but the maximum value of the strain generated in the support layer SPL may be increased.

However, as the coating films CT having a modulus higher than that of the support layer SPL and lower than those of the support bars SB, the coating films CT may absorb strain generated in the support bars SB. As the coating films CT decrease the modulus difference between the components of the support member MSP, the coating films CT may decrease the maximum value of the strain generated in the support layer SLP while maintaining the strain generated in the support bars SB to the minimum. Accordingly, the support member MSP having improved stiffness may be provided, and deformations of the support layer SPL and the support bars SB may all be prevented by the coating films CT. Thus, the surface quality of the display device DD (refer to FIG. 1A) may be effectively improved.

Additionally, according to this embodiment, the adhesive force between the coating films CT and the support layer SPL may be increased by coating the support bars SB with the coating films CT formed of a polymer material. The coating films CT may be disposed between the support bars SB and the support layer SPL and may improve the coupling force between the support bars SB and the support layer SPL during rolling. Accordingly, separation of the support layer SPL from the support bars SB may be prevented.

Figure 10A:
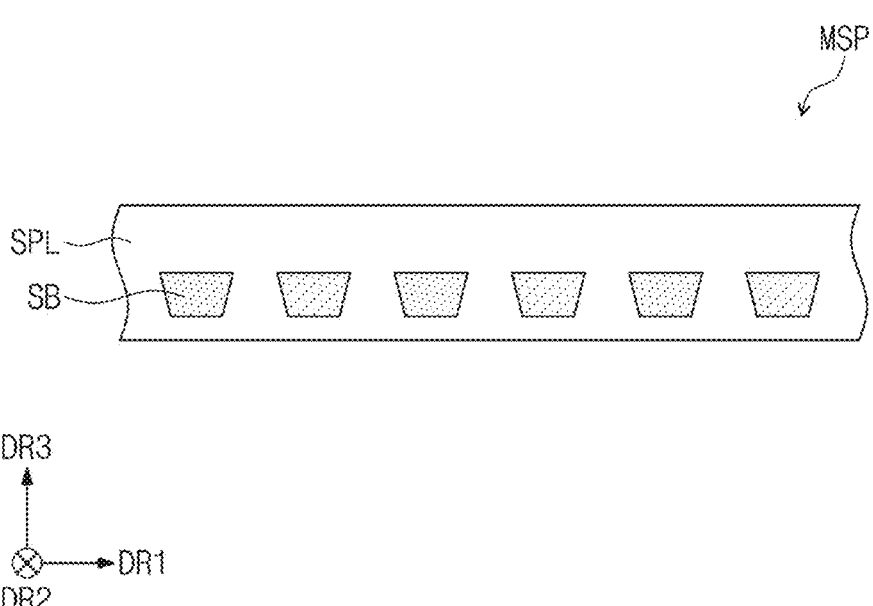
FIGS. 10A to 10C are sectional views of support members according to embodiments of the present disclosure.
Figure 10B:
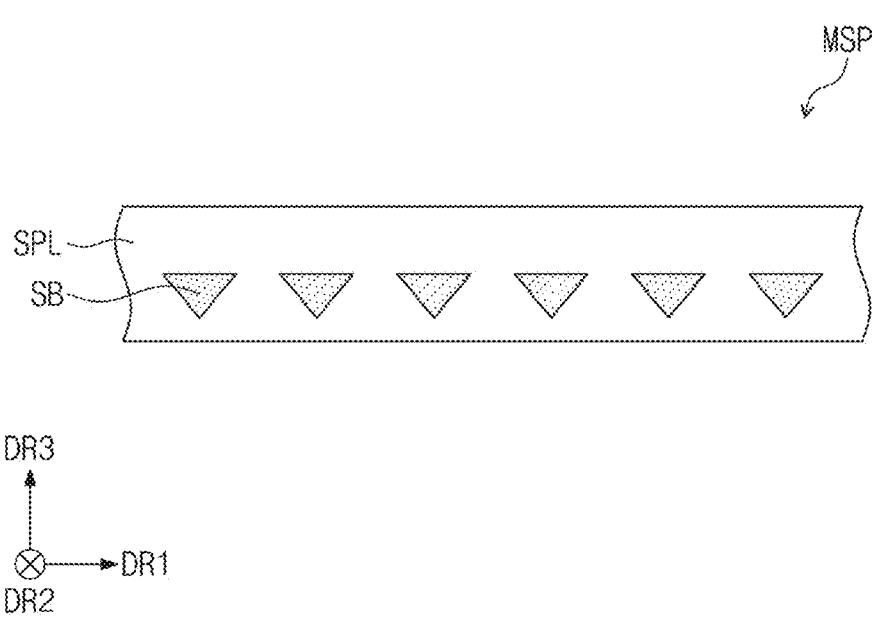
Figure 10C:
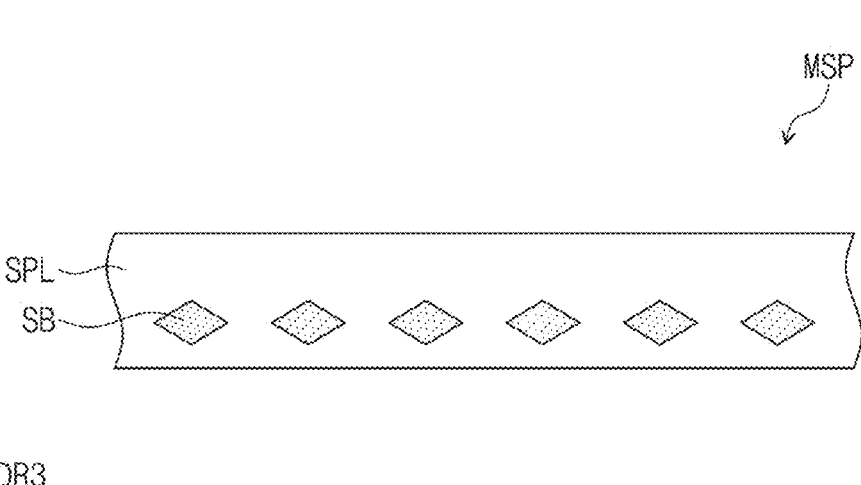

FIGS. 10A to 10C are sectional views of support members MSP according to embodiments of the present disclosure. In FIG. 7A, the support bars SB having a rectangular shape on the section (e.g., cross-sectional shape) viewed in the second direction DR2 are illustrated. However, without being limited thereto, the support bars SB may have various shapes on the section viewed in the second direction DR2, and FIGS. 10A to 10C illustrate embodiments of support bars SB having various shapes on sections.

Referring to FIG. 10A, support bars SB may have an inverted trapezoidal shape on a section viewed in the second direction DR2. Accordingly, the width W of the top surface of each of the support bars SB which is closest to the display module DM, in the first direction DR1, may be greater than the width W of the bottom surface.

Referring to FIG. 10B, support bars SB may have an inverted triangular shape on a section viewed in the second direction DR2. The top surface of each of the support bars SB may be parallel to the first direction DR1 and may have a predetermined width as a base of the triangle. A lower portion of each of the support bars SB may extend in the second direction DR2 and may have the form of one side at which side surfaces inclined from the top surface meet as the apex of the triangle. Here, the one side may be a curve convex upward on a section defined by the second direction DR2 and the third direction DR3.

Referring to FIGS. 10A and 10B, within the support layer SPL, each of the plurality of support bars SB may have a curved top shape at an upper portion closest to the upper surface U-S of the support member MSP and a curved bottom shape at a lower portion furthest from the upper surface U-S of the support member MSP, a cross-sectional shape which extends along the second direction DR2, includes inclined sidewall portions extended along a thickness of the support member MSP, and defines the curved top shape and the curved bottom shape, and the cross-sectional shape has a shape width along the first direction DR1, at each of the curved top shape and the curved bottom shape, the shape width at the curved top shape (e.g., top of trapezoid or top of triangle) being greater than the shape width at the bottom curved shape (e.g., bottom of trapezoid or bottom apex of triangle).

Referring to FIG. 10C, support bars SB may have a rhombic shape on a section viewed in the second direction DR2. An upper portion and a lower portion of each of the support bars SB may extend in the second direction DR2 and may have the form of sides at which inclined surfaces meet. On a section defined by the second direction DR2 and the third direction DR3, the sides defining the upper and lower portions of the support bars SB may be curves convex upward.

Referring to FIGS. 10B and 10C, for example, within the support layer SPL, each of the plurality of support bars SB may have a curved top shape at an upper portion closest to the upper surface U-S of the support member MSP and a curved bottom shape at a lower portion furthest from the upper surface U-S of the support member MSP, a cross-sectional shape (e.g., the triangle or rhombus) which extends along the second direction DR2, includes inclined sidewall portions extended along a thickness of the support member MSP, and defines the curved top shape and the curved bottom shape, and the curved bottom shape is defined at a point (e.g., bottom apex of triangle or bottom point of rhombus) where the inclined sidewall portions meet. The curved top shape may also be defined at a point where the inclined sidewall portions meet (e.g., top point of rhombus).

The cross-sectional shape of the support bars SB on the section viewed in the second direction DR2 is not limited to those illustrated in FIGS. 7A and 10A to 10C, and the support bars SB may have various cross-sectional shapes such as a circular shape, an oval shape, a polygonal shape, and the like.

Figure 11:
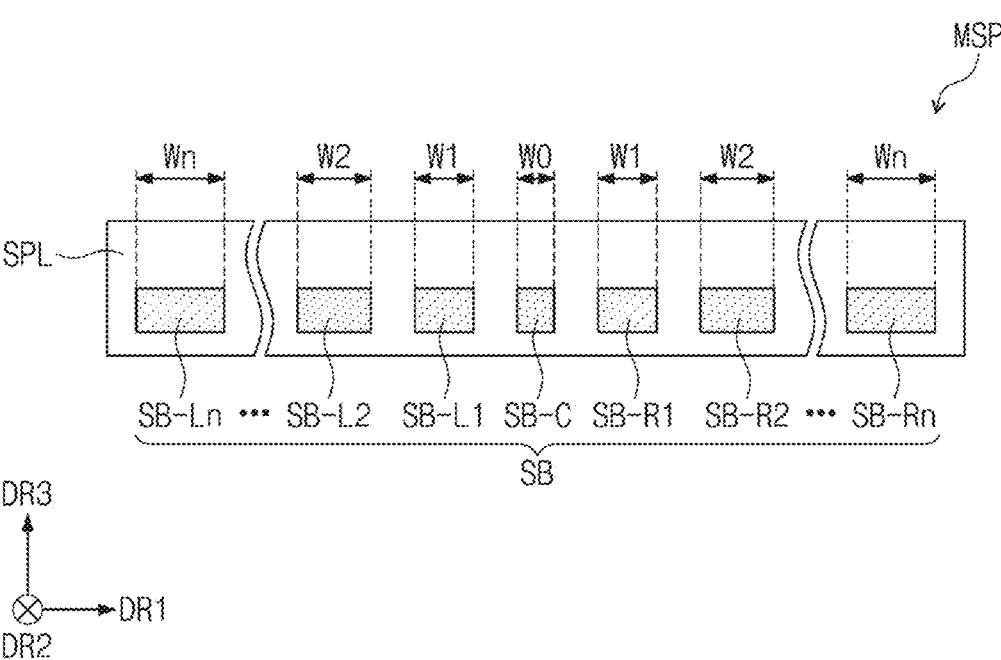
FIG. 11 is a sectional view of a support member according to an embodiment of the present disclosure.

FIG. 11 is a sectional view of a support member MSP according to an embodiment of the present disclosure. The support member MSP illustrated in FIG. 11 includes substantially the same components as the above-described support member MSP, and there is a slight difference in the sizes of the widths of support bars SB. The following description will be focused on the difference.

Referring to FIG. 11, the support bars SB may have different widths in the first direction DR1. The support bars SB may include a central support bar SB-C, a first support bar provided in plural including left support bars SB-L1 to SB-Ln arranged in one direction along the first direction DR1 from the central support bar SB-C, and a second support bar provided in plural including right support bars SB-R1 to SB-Rn arranged in an opposite direction to the one direction along the first direction DR1 from the central support bar SB-C.

The central support bar SB-C may be disposed at the center of a support layer SPL in the first direction DR1. Among the support bars SB, the central support bar SB-C may have the smallest width W0 (e.g. the minimal width) in the first direction DR1. The left support bars SB-L1 to SB-Ln may be disposed on the left side of the central support bar SB-C in the first direction DR1 so as to be spaced apart from each other. The right support bars SB-R1 to SB-Rn may be disposed on the right side of the central support bar SB-C in the first direction DR1 so as to be spaced apart from each other.

The left support bars SB-L1 to SB-Ln may include 'n' support bars, and the right support bars SB-R1 to SB-Rn may include 'n' support bars. The left support bars SB-L1 to SB-Ln and the right support bars SB-R1 to SB-Rn may be symmetrical with respect to the central support bar SB-C in the first direction DR1. However, embodiments are not necessarily limited thereto.

The first to n-th left support bars SB-L1 to SB-Ln may be sequentially arranged so as to be spaced apart from each other in a direction away from a left end of the central support bar SB-C. Among the first to n-th left support bars SB-L1 to SB-Ln, the first left support bar SB-L1 may be disposed closest to the central support bar SB-C in the first direction DR1. The first to n-th right support bars SB-R1 to SB-Rn may be sequentially arranged so as to be spaced apart from each other in a direction away from a right end of the central support bar SB-C. Among the first to n-th right support bars SB-R1 to SB-Rn, the first right support bar SB-R1 may be disposed closest to the central support bar SB-C in the first direction DR1.

The first left support bar SB-L1 and the first right support bar SB-R1 may have the same first width W1. The second left support bar SB-L2 and the second right support bar SB-R2 may have the same second width W2. The n-th left support bar SB-Ln disposed furthest from the central support bar SB-C among the first to n-th left support bars SB-L1 to SB-Ln and the n-th right support bar SB-Rn disposed furthest from the central support bar SB-C among the first to n-th right support bars SB-R1 to SB-Rn may have the same n-th width Wn.

The first to n-th widths W1 to Wn may differ from the width W0 of the central support bar SB-C. The first to n-th widths W1 to Wn may be greater than the width W0 of the central support bar SB-C. The values of the widths may be gradually increased from the first width W1 to the n-th width Wn, and among the first to n-th widths W1 to Wn, the n-th width Wn may have the largest value (e.g., the maximum width). That is, the widths of the left support bars SB-L1 to SB-Ln and the right support bars SB-R1 to SB-Rn in the first direction DR1 may be gradually increased as a distance from the central support bar SB-C increases.

When the display device DD (refer to FIG. 1B) is rolled, strain generated in the support member MSP may be increased from opposite ends of the support member MSP and toward the center of the support member MSP. The strain generated in the central portion of the support member MSP may be reduced by disposing a support bar SB having a relatively small width at the central portion of the support member MSP.

In FIG. 11, one central support bar SB-C is illustrated. However, without being limited thereto, a plurality of central support bars SB-C may be provided. The central support bars SB-C may be disposed in the central portion of the support layer SPL in the first direction DR1 and may have the smallest width W0 among widths of the plurality of support bars SB.

In FIG. 11, the support bars SB having a rectangular cross-sectional shape are illustrated. However, the cross-sectional shape of the support bars SB having different shapes is not limited thereto, and the support bars SB may have various shapes as illustrated in FIGS. 10A to 10C.

The display device DD of the present disclosure includes the support member MSP that supports the display module DM and is moveable together with the display module DM, where the support member MSP includes the support layer SPL and the plurality of support bars SB which are disposed within and contacting the support layer SPL and have a higher modulus than a modulus of the support layer SPL.

The support bars SB included in the support member MSP according to the embodiment of the present disclosure may extend in a direction parallel to the rolling axis and may include the curved surface extending in the extension direction of the support bars SB and convex toward the display panel DP disposed on the support member MSP. Accordingly, the impulse applied to the support bars SB may be decreased, and the impact resistance of the support member MSP may be improved.

The support layer SPL included in the support member MSP according to the embodiment of the present disclosure may cover the support bars MSP and may provide the flat upper surface along which the display panel DP is extended and supported. Accordingly, the support layer SPL may provide the flat surface to the display panel DP both inside and outside of a housing HS, while improving the impact resistance of the support member MSP and may improve the surface quality by maintaining a planar shape (e.g., flat) of the display device DD.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. A display device comprising:
a display panel which is rollable about a rolling axis, the rolling axis extending in a first direction; and
a support member facing the display panel and rollable together with the display panel,
wherein the support member includes:
a support layer defining an upper surface of the support member and a lower surface of the support member which is opposite to the upper surface and further from the display panel than the upper surface, and
a plurality of support bars within the support layer and each extending in the first direction, the plurality of support bars being arranged in a second direction crossing the first direction, and
wherein within the support layer, each of the plurality of support bars includes:
ends which oppose each other along the first direction, and
a single convexly curved portion which defines the ends and is convexly curved toward the upper surface of the support member, along the first direction.

2. The display device of claim 1, wherein within the support layer, the single convexly curved portion of each of the plurality of support bars has:
a first curved surface which is convex, and
a second curved surface which is opposite to the first curved surface, further from the display panel than the first surface, and concave.
3. The display device of claim 2, wherein the support layer covers the first curved surface and the second curved surface of each of the plurality of support bars.
4. The display device of claim 2, wherein for each of the plurality of support bars:
a center and the ends which oppose each other, are defined along the first direction,
a gap is defined between the first curved surface and the upper surface of the support member, and
the gap decreases in a direction from an end to the center.
5. The display device of claim 2, wherein for each of the plurality of support bars:
a center and the ends which oppose each other, are defined along the first direction,
a gap is defined between the second curved surface and the lower surface of the support member, and
the gap increases in a direction from an end to the center.
6. The display device of claim 1, wherein the upper surface and the lower surface of the support member which are defined by the support layer, are parallel to each other.
7. The display device of claim 1, wherein each of the plurality of support bars has a constant thickness along the first direction.
8. The display device of claim 1, wherein for each of the plurality of support bars:
a center and the ends which oppose each other, are defined along the first direction, and
a thickness of the support bar increases in a direction from an end to the center.
9. The display device of claim 1, wherein each of the plurality of support bars has one of a rectangular shape, a rhombic shape, an inverted trapezoidal shape, and an inverted triangular shape in a cross-sectional view along the first direction.
10. The display device of claim 1, wherein
each of the plurality of support bars and the support layer has a modulus, and
the modulus of each of the plurality of support bars is higher than the modulus of the support layer.
11. The display device of claim 1, wherein
each of the plurality of support bars includes metal or carbon fibers, and
the support layer includes an elastomer.
12. The display device of claim 1, wherein within the support member:
a coating film surrounds each of the plurality of support bars and the coating film is between each of the plurality of support bars and the support layer along a thickness of the support member,
each of the plurality of support bars, the coating film and the support layer has a modulus, and
the modulus of the coating film is higher than the modulus of the support layer and lower than the modulus of each of the plurality of support bars.
13. The display device of claim 1, wherein within the support member:
each of the plurality of support bars has a width along the second direction, and
the widths of the plurality of support bars are equal to each other.

14. The display device of claim 1, wherein within the support member:

a center of the support member is defined along the second direction, each of the plurality of support bars has a width along the second direction, and among the plurality of support bars:

a central support bar corresponds to the center of the support member and has the smallest width;

left support bars are arranged on a left side of the central support bar, in the second direction; and right support bars arranged on a right side of the central support bar which is opposite to the left side in the second direction, and widths of the left support bars and the right support bars increase as a distance from the central support bar increases along the second direction.

15. A display device comprising:

a display panel which is rollable about a rolling axis, the rolling axis extending in a first direction; and a support member facing the display panel and rollable together with the display panel, wherein the support member includes:

a support layer defining an upper surface of the support member, and a lower surface of the support member which is opposite to the upper surface and further from the display panel than the upper surface; and a plurality of support bars within the support layer, each of the plurality of support bars including:

ends which oppose each other along the first direction, a single convexly curved portion which defines the ends and has a center, along the first direction, and the single convexly curved portion including a first surface, and a second surface which is opposite to the first surface and further from the display panel than the first surface, wherein along a thickness direction of the support member a gap is defined between the second surface of each of the plurality of support bars, and the lower surface of the support member, respectively, and for each of the plurality of support bars, the gap increases in a direction from an end to the center.

16. The display device of claim 15, wherein along the thickness direction of the support member:

a lower thickness of the support layer is defined between the second surface and the lower surface, and the lower thickness increases in a direction from the end to the center.

17. The display device of claim 15, wherein along the thickness direction of the support member:

an upper thickness of the support layer is defined between the first surface and the upper surface; and the upper thickness decreases in a direction from the end to the center.

18. The display device of claim 15, wherein each of the plurality of support bars includes metal or carbon fibers, and the support layer includes a polymer.

19. The display device of claim 15, wherein for each of the plurality of support bars:

each of the first surface and the second surface is curved along the first direction and has a curvature with a center of curvature defined between the support bar and the lower surface of the support member, along the thickness direction of the support member, and the curvature of the first surface is the same as the curvature of the second surface.

20. The display device of claim 15, wherein for each of the plurality of support bars:

each of the first surface and the second surface is curved along the first direction and has a curvature with a center of curvature defined under the support bar, along the thickness direction of the support member, and the curvature of the first surface is greater than the curvature of the second surface.

21. An electronic device for providing an image comprising:

a display device comprising:

a display panel which is rollable about a rolling axis, the rolling axis extending in a first direction; and a support member facing the display panel and rollable together with the display panel, wherein the support member includes:

a support layer defining an upper surface of the support member and a lower surface of the support member which is opposite to the upper surface and further from the display panel than the upper surface, and a plurality of support bars within the support layer and each extending in the first direction, the plurality of support bars being arranged in a second direction crossing the first direction, and wherein within the support layer, each of the plurality of support bars includes:

ends which oppose each other along the first direction, and a single convexly curved portion which defines the ends and is convexly curved toward the upper surface of the support member, along the first direction.

* * * * *